United States Patent
Suzuki et al.

(10) Patent No.: US 7,126,924 B2
(45) Date of Patent: Oct. 24, 2006

(54) RADIO BASE STATION/RADIO BASE STATION CONTROLLER EQUIPPED WITH INACTIVITY TIMER, MOBILE STATION, AND STATE CONTROL METHOD

(75) Inventors: Masayasu Suzuki, Tokyo (JP); Manabu Yoshimura, Tokyo (JP); Shiro Mazawa, Tokyo (JP); Hideo Aoe, Tokyo (JP); Arata Nakagoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 999 days.

(21) Appl. No.: 10/090,736

(22) Filed: Mar. 6, 2002

(65) Prior Publication Data

US 2002/0172178 A1 Nov. 21, 2002

(30) Foreign Application Priority Data

May 16, 2001 (JP) ............................. 2001-145782
Jan. 31, 2002 (JP) ............................. 2002-023371

(51) Int. Cl.
*H04J 3/17* (2006.01)
*H04B 7/00* (2006.01)
*H04M 3/00* (2006.01)

(52) U.S. Cl. ...................... 370/311; 370/433; 455/418; 455/343.1

(58) Field of Classification Search ................ 370/433, 370/468, 310, 329, 431, 311; 455/418, 445, 455/450, 452.1, 455, 343.1–3
See application file for complete search history.

(56) References Cited

U.S. PATENT DOCUMENTS

2002/0068595 A1* 6/2002 Maggenti et al. ........... 455/519
2002/0094831 A1* 7/2002 Maggenti et al. ........... 455/518
2005/0117576 A1* 6/2005 McDysan et al. ........... 370/389

OTHER PUBLICATIONS

Ozer, S.Z., "Burst switching for third generation wireless communications," Vehicular Technology Conference, 1999. VTC 1999—Fall. IEEE VTS 50th, vol. 1, No. pp. 554-558 vol. 1, 1999.*
Sunay, M.O.; Tekinay, S.; Ozer, S.Z., "Efficient allocation of radio resources for CDMA based wireless packet data systems," Global Telecommunications Conference, 1999. GLOBECOM '99, vol. 1B, No. pp. 638-643 vol. 1b, 1999.*
Jae-Woo So; Dong-Ho Cho, "On effect of timer object for sleep mode operation in cdma2000 system," Communciations, 2000. ICC 2000. 2000 IEEE International Conference on, vol. 1, No. pp. 555-559 vol. 1, 2000.*
Koo, Haeng S. "Packet Data Inactivity Timer Based On Realm." Letter to Mr. Jean Alphonse. Mar. 6, 2001. TSG Correspondence, <ftp://ftp.3gpp2/org/Archive/TSGP%20(inactive)/Working/2001/20010409-Atlanta/Correspondences/>.*
Koo, Haeng S. "Packet Data Inactivity Timer Based on Realm." Letter to Mr. George Tumipseed and Mr. Jean Alphonse. Feb. 9, 2001. TSG Correspondence <ftp://ftp.3gpp2.org/TSGC/Working/2001/TSG-C_0102/TSG-C/Wg1/>.*

(Continued)

*Primary Examiner*—Chau Nguyen
*Assistant Examiner*—Kerri Dyke
(74) *Attorney, Agent, or Firm*—Mattingly, Stanger, Malur & Brundidge, P.C.

(57) ABSTRACT

In data communication using radio communication, an inactivity timer value is changed according to various states, so that an unused time of a communication channel in a non-communication time is decreased, and channel use efficiency is raised. A unit for judging an application of packet data to be transmitted and received by a radio base station 408/a radio base station controller 405 is provided, or an inactivity timer value is set through a port number in TCP/UDP header and a traffic pattern and according to a communication content, and the set inactivity timer value is used to control a change from a connected state to a dormant state.

9 Claims, 22 Drawing Sheets

OTHER PUBLICATIONS

TSG-P Meeting Summary. Meeting #21. Jan. 15-19, 2001. pp. 1-6. <http://www.3gpp2.com/Public_html/Summaries/2001_Summaries.cfm>.*

Realm Configured Packet Data Session Dormancy Timer. 3GPP2 S.R0033 v. 1.0. Dec. 6, 2001 <http://www.3gpp2.com/Public_html/specs/tsgs.cfm>.*

TR45, "Data Service Options for Spread Spectrum Systems: cdma2000 High Speed Packet Data Service Option 33", PN-4692.12, Ballot Version, Jan. 2000.

3$^{rd}$ Generation partnership Porject 2 "3GPPZ", cdma 2000 High Rate Packet Air Interface Specification, 3GPP2 c.s0024, Version 2.0, Oct. 27, 2000.

* cited by examiner

| CONNECTION DESTINATION TYPE | CONNECTION DESTINATION TYPE FIELD VALUE | INACTIVITY TIMER VALUE |
|---|---|---|
| DEFAULT | — | 60 SECONDS |
| WWW SERVER | 0 | 100 SECONDS |
| WAP SUPPORT SERVER | 1 | 30 SECONDS |

FIG. 9

| USER IDENTIFIER | CONNECTION DESTINATION TYPE | CONNECTION DESTINATION TYPE FIELD VALUE | INACTIVITY TIMER VALUE |
|---|---|---|---|
| A | DEFAULT | — | 60 SECONDS |
| A | WWW SERVER | 0 | 80 SECONDS |
| A | WAP SUPPORT SERVER | 1 | 20 SECONDS |
| B | DEFAULT | — | 45 SECONDS |
| B | WWW SERVER | 0 | 150 SECONDS |
| B | WAP SUPPORT SERVER | 1 | 60 SECONDS |
| C | DEFAULT | — | 60 SECONDS |
| C | WWW SERVER | 0 | 200 SECONDS |
| C | WAP SUPPORT SERVER | 1 | 25 SECONDS |

FIG. 14

| PORT NUMBER | APPLICATION TYPE | INACTIVITY TIMER VALUE |
|---|---|---|
| DEFAULT | | 60 SECONDS |
| 21 | f t p | 100 SECONDS |
| 80 | h t t p | 100 SECONDS |
| . | . | . |
| . | . | . |
| . | . | . |
| OTHER THAN WELL-KNOWN PORT NUMBER | | 30 SECONDS |

| PAST COMMUNICATION AMOUNT | INACTIVITY TIMER VALUE |
|---|---|
| DEFAULT | 60 SECONDS |
| LESS THAN 3000 PACKETS | 60 SECONDS |
| NOT LESS THAN 3000 PACKETS | 100 SECONDS |
| NOT LESS THAN 10000 PACKETS | 200 SECONDS |

FIG. 22

| PAST COMMUNICATION CONTENT | INACTIVITY TIMER VALUE |
|---|---|
| DEFAULT | 60 SECONDS |
| OCCASIONS OF WAP CONNECTION ARE LARGER THAN INTERNET CONNECTION | 30 SECONDS |
| OCCASIONS OF INTERNET CONNECTION ARE LARGER THAN WAP CONNECTION | 100 SECONDS |

FIG. 24

RADIO BASE STATION/RADIO BASE STATION CONTROLLER EQUIPPED WITH INACTIVITY TIMER, MOBILE STATION, AND STATE CONTROL METHOD

BACKGROUND OF THE INVENTION

1. Field of the Invention

The present invention relates to a radio base station/radio base station controller (hereinafter referred to as a base station) for carrying out radio communication with a mobile station, a mobile station, and a state control method of those, and particularly to a base station, a mobile station, and a state control method of those, in which setting of an inactivity timer value is dynamically changed according to a use state to decrease an unused time of a radio channel in a non-communication time in which transmission/reception of data is not carried out and to improve the use efficiency of the radio channel. Incidentally, the inactivity timer value is, as described below, a value for determining the timing when a radio channel disconnection processing for changing a connected state to a dormant state is started (see a document "cdma 2000 High Rate Packet Data Air Interface Specification, 3GPP2 C. S0024 Version 2.0, Oct. 27, 2000").

2. Description of the Related Art

From the development of a recent digital mobile communication system, radio packet data communication services have been provided in addition to voice communication services. In the radio packet data communication services, a user accesses a server apparatus through a base station, an internet network and the like, so that exchange of E-mail, browse of Web information, and the like can be carried out anytime and everywhere. However, communication resources used for radio communication, for example, frequency resources are finite, and in order to provide services to the most possible subscribers by the finite frequencies, it is very important to disconnect a radio channel in which transmission/reception of data is not carried out and to assign it to another user.

In the radio packet data communication, as disclosed in a document "Data Service Options for Spread Spectrum Systems: cdma2000 High Speed Packet Data Service Option 33, PN-4692.12 (TIA/EIA/IS-707-A-2.12), January 2000", there are a "connected state" and a "dormant state" as a state of transmission/reception of a packet. The "connected state" is a state in which a radio channel is connected between a base station and a mobile station. On the other hand, the "dormant state" is a state in which a call is brought into a suspended state and the radio channel is temporarily disconnected between the base station and the mobile station. In general use environment of the radio packet data communication, there are few cases where packets are always transmitted and received between the base station and the mobile station, and the packets are normally intermittently transmitted and received. Then, a method is adopted in which if the packet is not transmitted and received for a definite time in the connected state, the state is forcibly changed to the dormant state. For that purpose, a timer called an inactivity timer which starts to count up from the completion of packet transmission/reception is set, and in the case where new transmission/reception is not carried out in a timer set time, the state is changed to the dormant state. An inactivity timer value as a timer for changing the connected state to the dormant state is calculated on the basis of the system architecture, the traffic amount and the like, and a specific fixed value is not regulated. The above document suggests that the inactivity timer value is not set to a value of 20 seconds or less.

Besides, in general, in the radio communication, while a mobile station continues communication (connection of a radio channel), switching of a base station under communication (hand-over) is carried out. Thus, the number of mobile stations in a cell managed by a certain base station becomes fluent. Besides, since the frequency resources are finite, in order to provide services using a radio channel for many subscribers, it is necessary to assign the radio channel to the most possible users. Then, by setting the inactivity timer, the radio channel in which transmission/reception of data is not carried out is temporarily disconnected, and the radio channel is temporarily assigned to another mobile station requiring transmission/reception of data, and as a result, the radio channel can be efficiently used.

In the prior art, a fixed value is used for the set value of the inactivity timer irrespectively of the type of data to be transmitted and received. However, a transmission interval is varied according to the type of data. Thus, in the case where the set value of the inactivity timer is made the fixed value, unless the inactivity timer value is suitably set according to a traffic amount in such a manner that it is set to be short when data such as E-mail having a small size and taking a short communication time is intermittently transmitted and received, and it is set to be long when data such as stream data having a large size and taking a considerable communication time is divided into packets and is transmitted and received, there is a problem that surplus processing due to connection/disconnection of the radio channel is increased, and the use efficiency of the radio channel is lowered.

In the case where hand-over is carried out with the movement of a mobile station while a radio channel is connected, as compared with the case where the movement is made without connection of the radio channel, the processing amount of the mobile station/the radio base station/the radio base station controller is increased. This is because in the movement at the time when the radio channel is not connected, only the position registration information is transmitted from the mobile station to the radio base station/the radio base station controller, whereas if the radio channel remains connected, in order to maintain the radio channel, an exchange between the mobile station/the radio base station/the radio base station controller occurs. Thus, it is necessary to suitably set the inactivity timer value according to the traffic amount, for example, the radio channel of the mobile station in which the traffic amount is small is disconnected rather early.

As means for solving the above problem, it is also conceivable that the fixed value of the inactivity timer is calculated from a past traffic amount etc. in a certain cell. However, as long as the fixed value of the inactivity timer is used, the above problem always remains.

SUMMARY OF THE INVENTION

An object of the present invention is to decrease an unused time of a communication channel in a non-communication time and to raise channel use efficiency by changing an inactivity timer value according to various states such as the type of data. By this, there also occurs an opportunity of raising the communication opportunity of each mobile station. Besides, another object of the present invention decreases the number of connection/disconnection processings of a radio channel by suitable setting of an inactivity timer for each application.

In the present invention, a set value of an inactivity timer is changed especially by the type of data to be transmitted and received. Specifically, an inactivity timer value of a mobile station for intermittently transmitting and receiving data having a small size and taking a short communication time is set to a short time, and an inactivity timer value of a mobile station for transmitting and receiving data having a large size, taking a considerable communication time, and divided into packets is set to a long time. Since a time when a mobile station occupies a radio channel can be decreased on average by that, it is possible to give an opportunity of using the radio channel to many mobile stations in a cell.

Besides, in the present invention, by writing information indicating a data type into some field of a packet transmitted by a mobile station and a base station, the mobile station or the base station judges a transmission destination of the packet, and changes a set value of an inactivity timer. Since a transmission/reception interval of a packet is also varied by the data type, suitable disconnection of the radio channel and maintenance of the radio channel can be carried out by individually setting the inactivity timer according to the data type.

According to first solving means of the present invention, a radio base station/radio base station controller for carrying out communication with a mobile station by using a radio channel, comprises:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to an application type, a connection destination type, or a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acquires information of the application type, the connection destination type, or the traffic pattern in the transmitted or received data, the control unit refers to the memory on the basis of the acquired information of the application type, the connection destination type, or the traffic pattern to obtain an inactivity timer value and sets the inactivity timer value, and when a count value of the inactivity timer reaches the set inactivity timer value, the control unit carries out a control to change the connected state to the dormant state.

According to second solving means of the present invention, a mobile station for carrying out communication with a radio base station/radio base station controller by using a radio channel, comprises:

a control unit for controlling a connected state in which the radio channel for carrying out communication with the radio base station/radio base station controller is secured and a dormant state in which a call is brought into a suspended state and the radio channel is disconnected;

a memory for storing an inactivity timer value as a timing when the connected state is changed to the dormant state, according to an application type, a connection destination type, or a traffic pattern; and an inactivity timer for starting to count up in response to reception of a packet from the radio base station/radio base station controller or transmission of a packet to the radio base station/radio base station controller, wherein in a case where the mobile station transmits or receives data to or from the radio base station/radio base station controller, the control unit acquires information of the application type, the connection destination type, or the traffic pattern in the transmitted or received data, the control unit refers to the memory on the basis of the acquired information of the application type, the connection destination type, or the traffic pattern to obtain an inactivity timer value and sets the inactivity timer value, and when a count value of the inactivity timer reaches the set inactivity timer value, the control unit carries out a control to change the connected state to the dormant state.

According to third solving means of the present invention, in a state control method for controlling a connected state in which a radio channel for carrying out communication between a radio base station/radio base station controller and a mobile station is secured and a dormant state in which a call is brought into a suspended state and the radio channel is disconnected, the state control method of the radio base station/radio base station controller is provided in which:

in a case where the radio base station/radio base station controller transmits or receives data to or from the mobile station, a control unit acquires information of an application type, a connection destination type, or a traffic pattern in the transmitted or received data;

an inactivity timer value as a timing when the connected state is changed to the dormant state is set on the basis of the acquired information of the application type, the connection destination type, or the traffic pattern; and when a count value of an inactivity timer, which starts to count up in response to transmission/reception of a packet from a specified mobile station or to the mobile station, reaches the set inactivity timer value, a control to change the connected state to the dormant state is carried out.

According to fourth solving means of the present invention, in a state control method for controlling a connected state in which a radio channel for carrying out communication between a radio base station/radio base station controller and a mobile station is secured and a dormant state in which a call is brought into a suspended state and the radio channel is disconnected, the state control method of the mobile station is provided in which:

in a case where the mobile station transmits or receives data to or from the radio base station/radio base station controller, information of an application type, a connection destination type, or a traffic pattern in the transmitted or received data is acquired;

an inactivity timer value as a timing when the connected state is changed to the dormant state is set on the basis of the acquired information of the application type, the connection destination type, or the traffic pattern; and when a count value of an inactivity timer, which starts to count up in response to transmission/reception of a packet from a specified radio base station/radio base station controller or to the radio base station/radio base station controller, reaches the set inactivity timer value, a control to change the connected state to the dormant state is carried out.

BRIEF DESCRIPTION OF THE DRAWINGS

FIG. 9 is a view showing an example of a correspondence table of a connection destination type and an inactivity timer value in the present invention.

FIG. 14 is a view showing an example, in the present invention, of a correspondence table of a connection destination type and a different inactivity timer value for each user.

FIG. 22 is an example of a correspondence table of a past communication amount and an inactivity timer value in the present invention.

FIG. 24 is an example of a correspondence table of a past communication content and an inactivity timer value in the present invention.

DETAILED DESCRIPTION OF THE PREFERRED EMBODIMENTS

1. Fixed Value Setting of an Inactivity Timer

Before the present invention is described, as a relevant technique, a problem in a case where an inactivity timer is made a fixed value will be described with reference to FIGS. 1 to 3.

Figure 1:
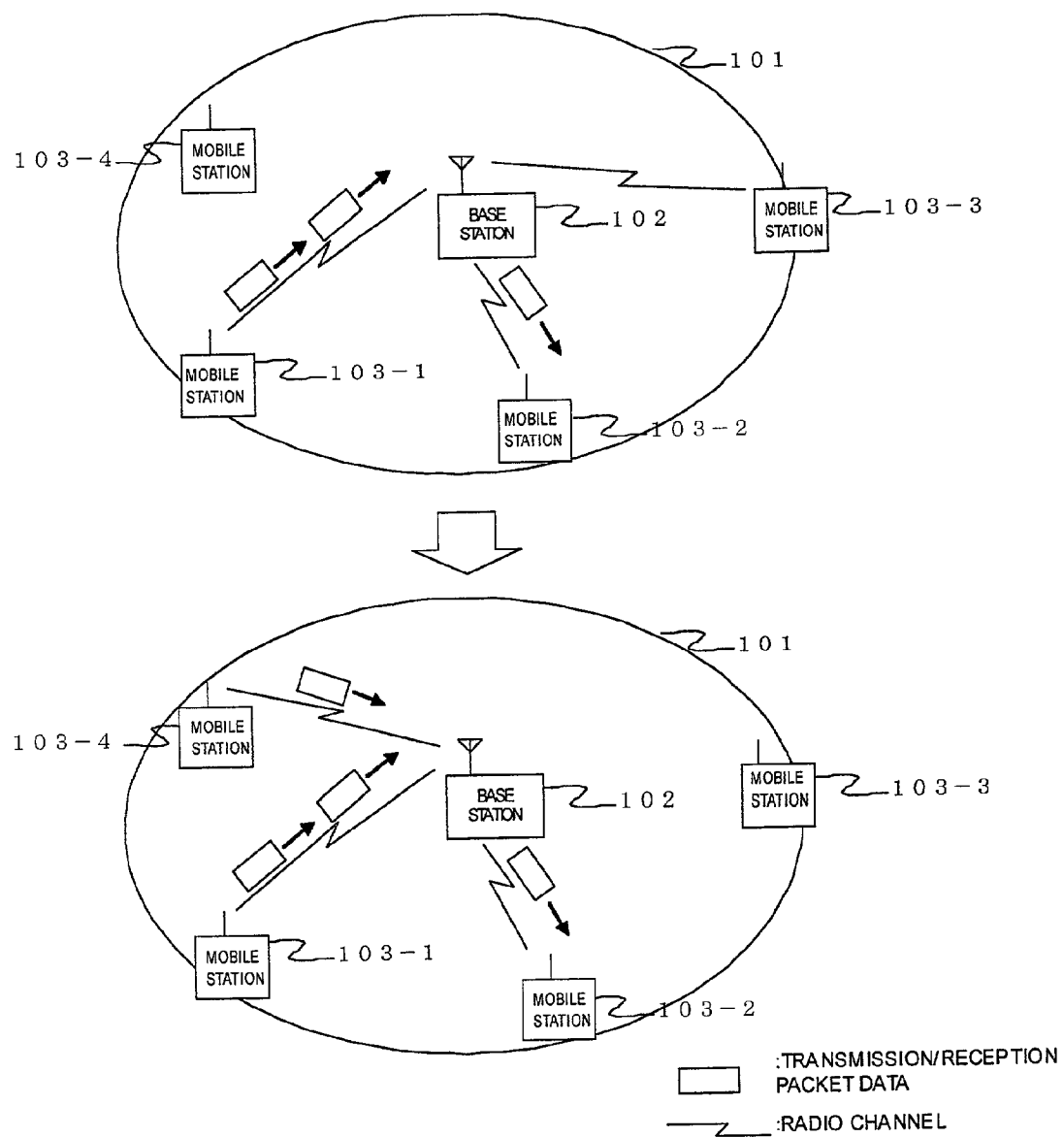
FIG. 1 is a view showing a use state of a radio channel in a case where an inactivity timer is used.

FIG. 1 is a view showing a use state of a radio channel in a case where an inactivity timer is used. It is assumed that a base station 102 can connect three radio channels in a cell 101 at the maximum. Besides, in the cell 101, there are mobile stations 103-1 to 103-3 already connecting the radio channels. It is assumed that the mobile stations 103-1 and 103-2 are carrying out transmission/reception of data to the base station 102, however, although the mobile station 103-3 connects the radio channel, it does not transmit and receive data. At this time, even if a mobile station 103-4 newly attempts to connect a radio channel and to carry out transmission/reception of data, since three radio channels are already connected in the base station 102, a new radio channel can not be connected, and transmission/reception of data to the base station 102 can not be carried out. Thus, an inactivity timer for monitoring transmission/reception of data on a radio channel is set in the base station 102, and a radio channel in which transmission/reception of data is not carried out for a specific time is disconnected. In FIG. 1, the radio channel between the mobile station 103-3 and the base station 102 in which transmission/reception of data is not carried out is disconnected, and a new radio channel is connected between the mobile station 103-4 attempting to carry out transmission/reception of data and the base station 102.

Figure 2:
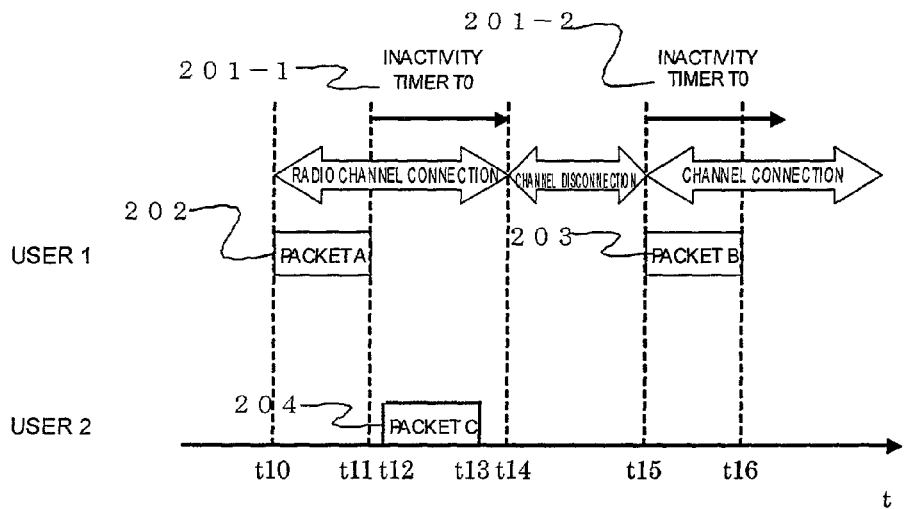
FIG. 2 is a view showing a state of a radio channel in a case where an inactivity timer is made a fixed value, and data having a small size and taking a short communication time is intermittently transmitted and received.

FIG. 2 is a view showing an example of a case where data such as E-mail having a small size and taking a short communication time is intermittently transmitted and received (from a base station to a mobile station, or from the mobile station to the base station). Incidentally, in the example of FIG. 2, it is assumed that only one radio channel can be connected between the base station and mobile stations, and there are two users of a user 1 and a user 2 in a cell managed by the base station. The transmission of a packet A (202) of the user 1 to the base station is completed at time t11, and the user 1 does not transmit another packet B (203) until time t15. At this time, if an interval between t11 and t14 is set to be long as compared with a communication time of the packet A between t10 and t11, that is, if an inactivity timer TO (201-1 through 201-2) set for the user 1 is set to be long, although transmission/reception of data is not carried out, the radio channel continues to be connected for a long time. Even if the user 2 attempts to transmit a packet C (204) to the base station in such a state at time t12, since there is no free radio channel, a radio channel can not be connected between the base station and the mobile station.

Figure 3:
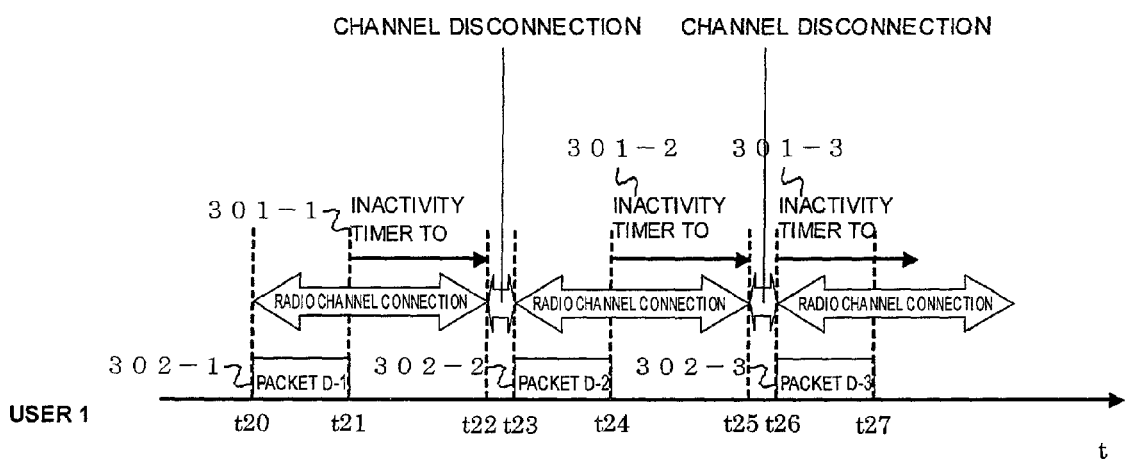
FIG. 3 is a view showing a state of a radio channel in a case where an inactivity timer is made a fixed value, and data having a large size and taking a considerable communication time, that is, a plurality of divided packets are transmitted and received.

FIG. 3 is a view showing an example of a case where data, such as stream data of moving picture etc., having a large size and taking a considerable communication time is transmitted and received (from a base station to a mobile station, or from the mobile station to the base station). When such data exceeds a maximum length of a packet size which can be transmitted and received on a radio channel, the stream data is divided into a plurality of packets and is transmitted and received. Besides, a transmission/reception interval of the packet is not constant according to the processing capacity of a packet transmission source, the state of a radio channel, and the like. In the example of FIG. 3, it is assumed that stream data is divided into packet data of a packet D-1 (302-1), a packet D-2 (302-2), and a packet D3 (302-3). When the transmission of the packet D-1 to the mobile station is completed at time t21, next, the packet D-2 is transmitted. At this time, if an interval from t21 to t22 is set to be short as compared with a communication interval from t21 to t23 between the packet D-1 and the packet D-2, that is, a set value of an inactivity timer TO (301-1 through 301-3) set for the user 1 is set to be short, although the base station does not complete the transmission of all blocks of data, the state is changed to the dormant state. Thus, each time when an attempt to transmit non-transmitted data is made, it becomes necessary to again connect the radio channel to change the dormant state to the connected state. By this, a time until completion of transmission of all data is delayed, and eventually, the radio channel is occupied for a long time.

2. First Embodiment—Setting of an Inactivity Timer According to a Header of a Transmission or Reception Packet 2-1. Setting of an Inactivity Timer According to an Application Type (Data Type)

Hereinafter, an embodiment of the present invention will be described with reference to the drawings.

Figure 4:
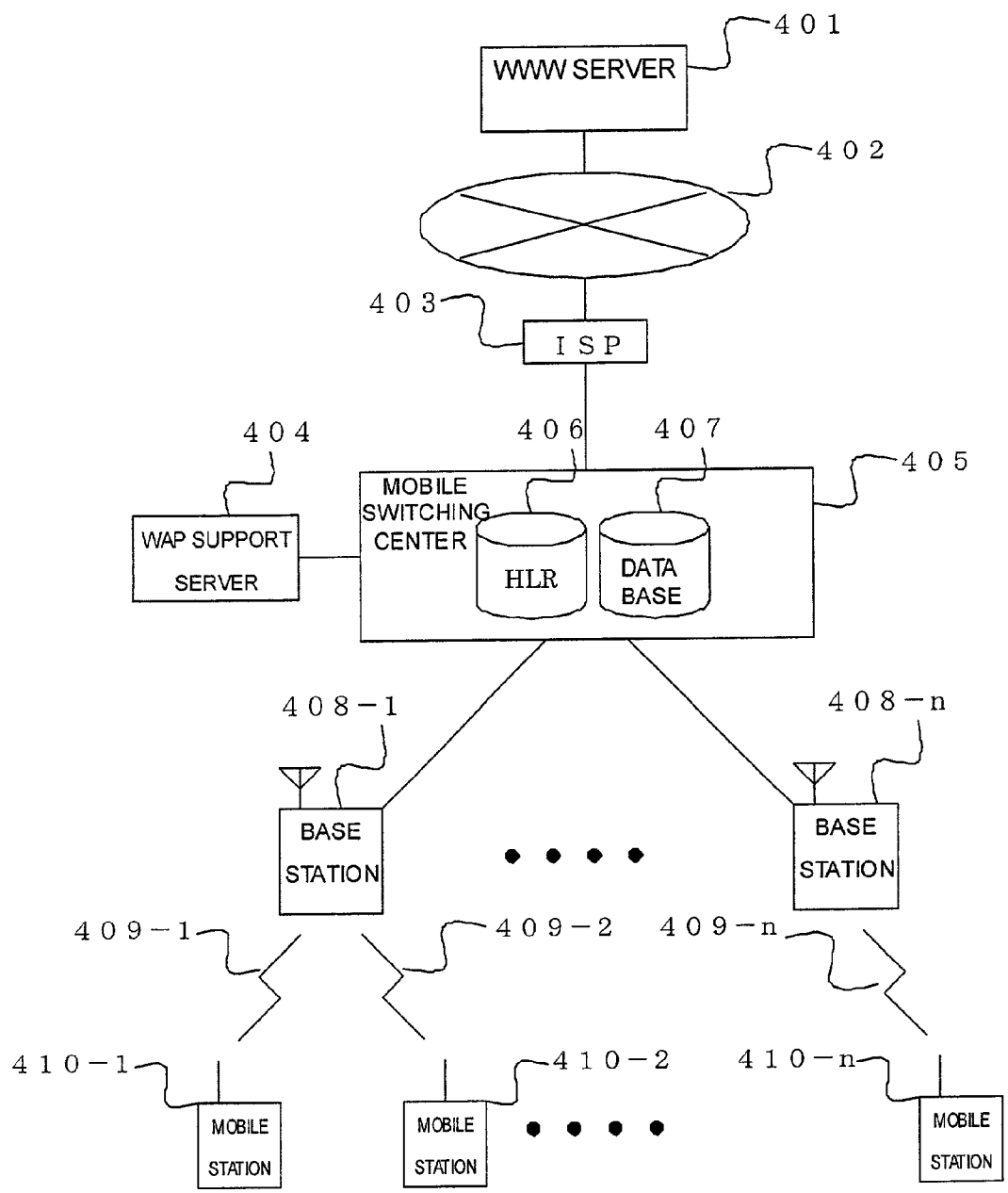
FIG. 4 is a view showing a network architecture of a radio communication system in the present invention.

FIG. 4 is a view showing a network architecture of a radio communication system in the present invention. A mobile switching center 405 has a switching function in mutual communication of a mobile station 410, and a base station 408 controls a communication channel between the mobile station 410 and the mobile switching center 405 and controls a radio channel 409 with the mobile station 410. An HLR (Home Location Register) 406 in the mobile switching center is an apparatus for storing subscriber data at the time of contract of a mobile station and carrying out position management of the mobile station, and a data base 407 is an apparatus for storing various pieces of information relating to the mobile station 410. The architecture of an inactivity timer in the present invention is included in the base station 408 or the mobile station 410.

In the case where a service such as the Internet is used from the mobile station, the mobile station accesses a WWW (World-Wide Web) server 401 through an ISP (Internet Service Provider) 403 for providing a connection service between the mobile switching center and an internet network 402. In the case where a service such as E-mail is used, the mobile station accesses a WAP (Wireless Application Protocol) support server 404 through the mobile switching center. Incidentally, the WAP is the specifications of a contents description language and a communication protocol for quickly displaying information on the Internet by using a mobile station such as a cellular phone.

Figure 5:
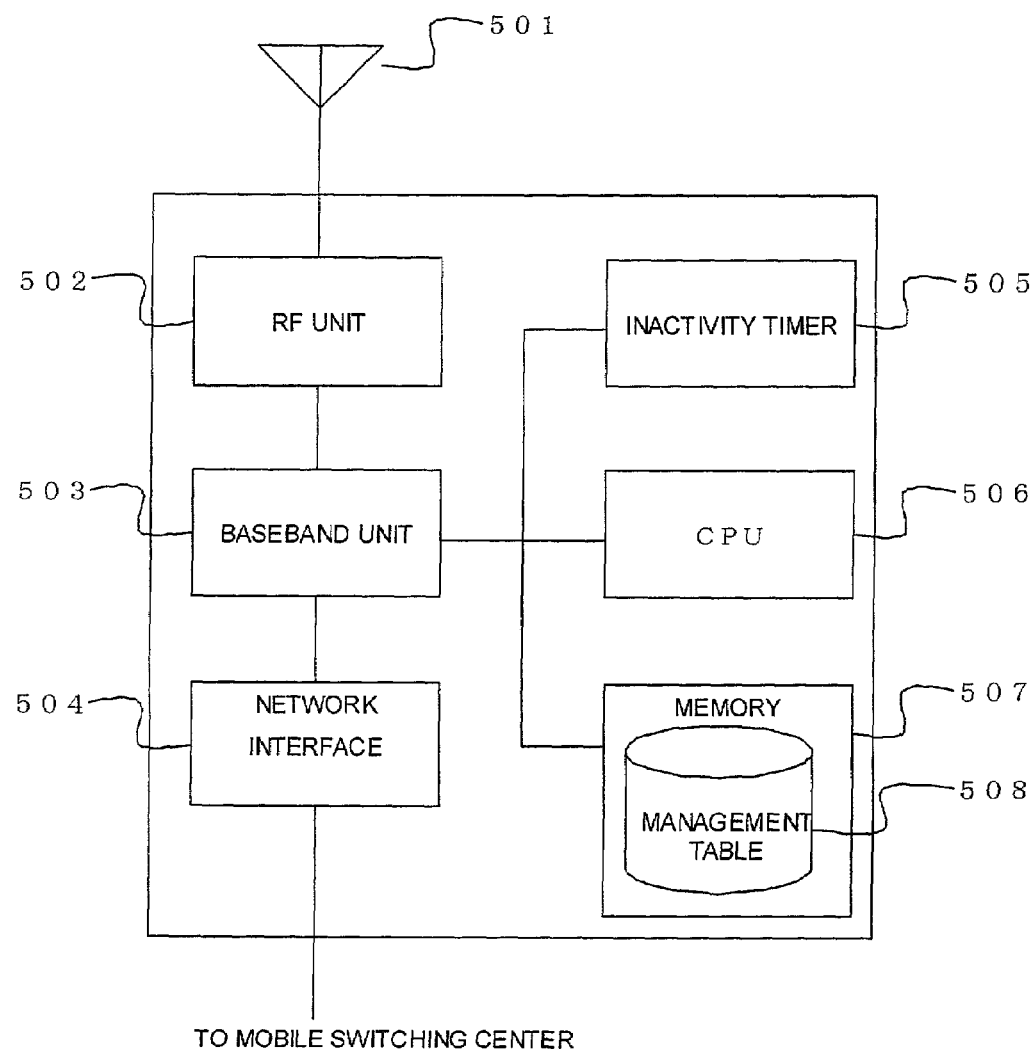
FIG. 5 is a view showing a base station architecture in the present invention.

FIG. 5 is a view showing the architecture of the base station in the present invention. An RF (Radio Frequency) unit 502 converts a signal to be transmitted to a mobile station through an antenna 501 to a frequency for transmission, and converts a signal received from the mobile station to an original frequency. A baseband unit 503 carries out a processing of a baseband signal. A network interface 504 carries out transmission/reception of a signal to the mobile switching center. A CPU (Central Processing Unit) 506 controls an inactivity timer 505 and a memory 507 including a management table 508. The inactivity timer 505 refers to the management table 508 of the memory 507 and sets an inactivity timer value. Incidentally, tables of FIG. 9, FIG. 14, etc. described later are stored in the management table 508.

Figure 6:
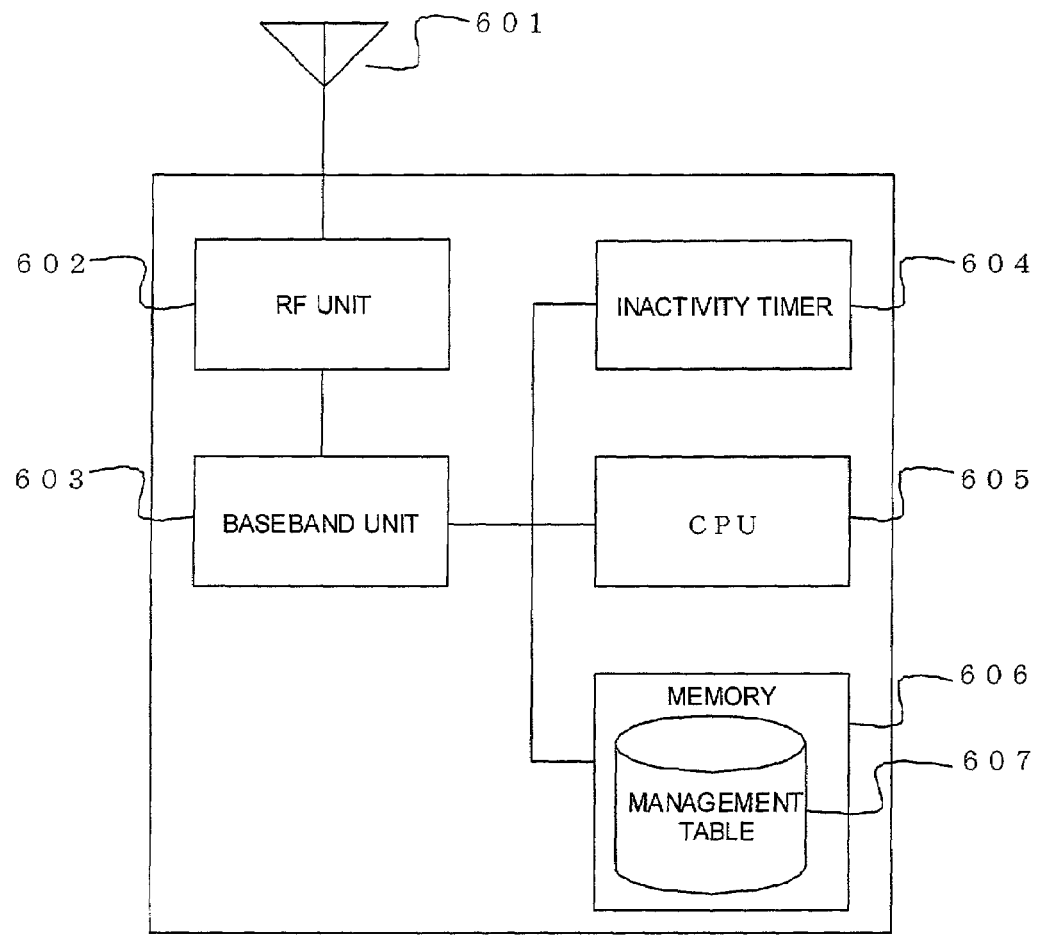
FIG. 6 is a view showing a mobile station architecture in the present invention.

FIG. 6 is a view showing the architecture of the mobile station in the present invention. An RF unit 602 converts a signal to be transmitted to a base station through an antenna 601 to a frequency for transmission and converts a signal received from the base station to an original frequency. A baseband unit 603 carries out a processing of a baseband signal. A CPU 605 controls an inactivity timer 604 and a memory 606 including a management table 607, similarly to the base station.

An inactivity timer value regulates a timing of starting a radio channel disconnection processing for changing a connected state to a dormant state. The inactivity timers 505 and 604 start to count up from a point of time when transmission/reception of a packet is completed in the connected state, and carry out a processing of forcibly changing the connected state to the dormant state to disconnect a radio channel when a count value becomes a set timer value.

Incidentally, in FIGS. 5 and 6, since the setting of the inactivity timer can also be realized by software processing of the CPUs 506 and 605, the inactivity timers 505 and 604 may be included in the CPUs 506 and 605, respectively. Besides, the inactivity timer may be provided in one of the base station and the mobile station, or may be provided in both. In the case where the inactivity timer is provided in both, a method of giving priority to either one, a method of controlling a timing by an early or late one, or the like can be suitably determined.

Next, an effect of a case where a set value of an inactivity timer is varied according to the type of data will be described with reference to FIGS. 7 and 8.

Figure 7:
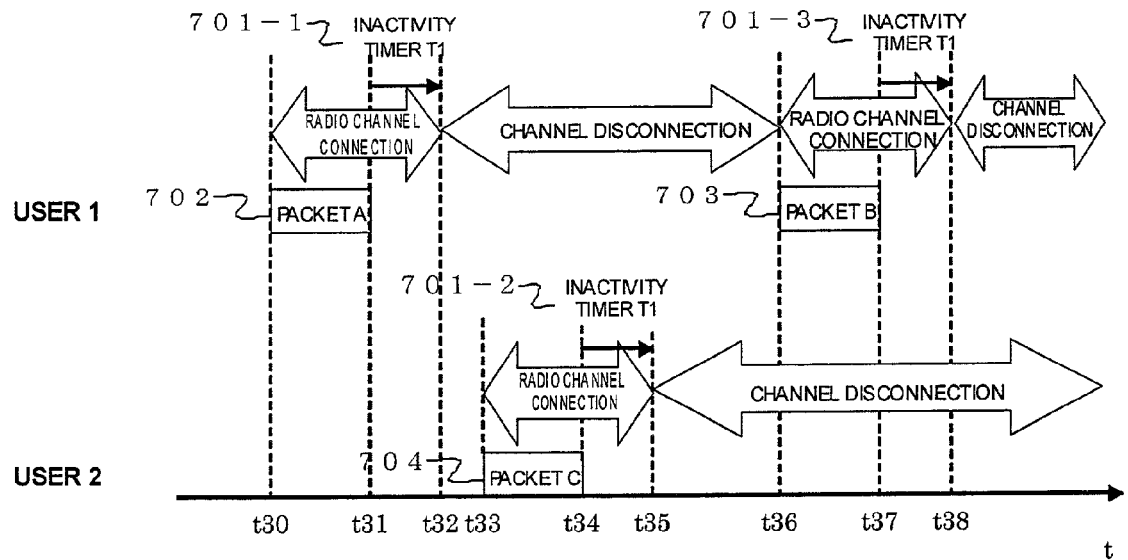
FIG. 7 is a view showing a state of a radio channel in a case where an inactivity timer is made an optimum value, and data having a small size and taking a short communication time is intermittently transmitted and received.

FIG. 7 is a view showing a state of a radio channel in a case where a set value of an inactivity timer is set to be short for data having a long non-communication time as compared with a data communication time, that is, data having a small size and taking a short communication time. Incidentally, in the example of FIG. 7, it is assumed that only one radio channel can be connected between the base station and mobile stations, and there are two users of a user 1 and a user 2 in a cell managed by the base station. The transmission of a packet A (702) of the user 1 to the base station is completed at time t31, and the user 1 does not transmit another packet B (703) until time t36. Next, the user 2 attempts to transmit a packet C (704) to the base station. At this time, since the set value of the inactivity timer T1 (701-1 through 701-3) is set to be short, the radio channel between the mobile station of the user 1 and the base station is disconnected at time t32, and the mobile station of the user 2 can newly connect a radio channel at time t33. Besides, when the user 1 attempts to transmit another packet B (703) to the base station at time t36, since the radio channel between the mobile station of the user 2 and the base station is already disconnected at time t35, the mobile station of the user 1 can newly connect a radio channel.

Figure 8:
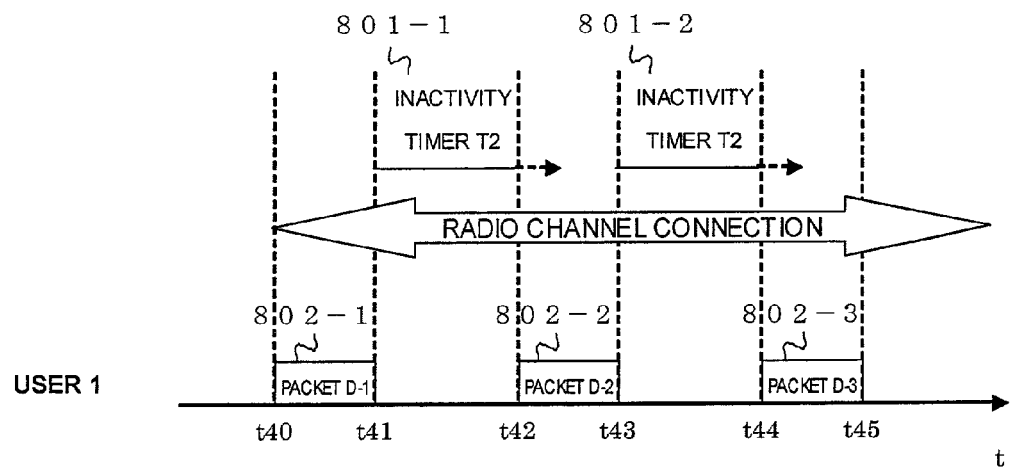
FIG. 8 is a view showing a state of a radio channel in a case where an inactivity timer is made to have an optimum value, and data having a large size and taking a considerable communication time, that is, a plurality of divided packets are transmitted and received.

FIG. 8 is a view showing a state of a radio channel when a set value of an inactivity timer is set to be long as compared with a non-communication time for each transmission/reception of data divided into a plurality of packets, in a case where data such as stream data having a large size and taking a considerable communication time is transmitted and received. Incidentally, also in the following, similarly to FIG. 3, it is assumed that the stream data is divided into packet data of a packet D-1 (802-1), a packet D-2 (802-2) and a packet D-3 (802-3). The transmission to the mobile station of the packet D-1 (802-1) of the user 1 is completed at time t41, and an inactivity timer T2 (801-1 through 801-2) is set. Next, the next packet D-2 (802-2) is transmitted at time t42. In FIG. 8, since the next packet 20 D-2 (802-2) is transmitted before the inactivity timer T2 (801-1) expires, the transmission/reception of the data can be continued without carrying out a disconnection processing of the radio channel and a reconnection processing of the radio channel.

Incidentally, the inactivity timer T1 (701) in FIG. 7 is made shorter than the inactivity timer T2 (801)in FIG. 8.

FIG. 9 is a view showing an example of a correspondence table of a connection destination type and an inactivity timer value. This correspondence table is stored in, for example, the management table 508 of the memory 507 in the base station shown in FIG. 5. Incidentally, in the following, a radio channel is divided into a radio control channel used for exchange of control information etc. and a radio traffic channel for exchange of data of a user, and a description will be given. The connection destination type here is made three types of a default, a WWW server, and a WAP support server. The default indicates a set value of the inactivity timer which is set immediately after a radio traffic channel is established. The case of connection with the WWW server indicates the Internet or the like including an application protocol such as http or ftp. The case of connection with the WAP support server indicates E-mail for a cellular phone, or the like. In the example of FIG. 9, in the case of the WWW server connection, on the assumption that the data has a relatively large size and takes a considerable communication time, the set value of the inactivity timer is made 100 seconds so that the channel is not cut off even if some non-communication time exists and the connected state is held for a longer time. In the case of the WAP support server connection, on the assumption that the data has a small size and takes a relatively short communication time, the set value of the inactivity timer is made 30 seconds so that the radio traffic channel can be assigned to more mobile stations. Besides, it is assumed that a connection destination type field value is added to a header of packet data to be transmitted and received between a mobile station and a base station. As an example, in a document "3GPP2 C.S0024 ver 2.0", the connection destination type field value can be set in a stream layer field of a stream layer header added to a packet to be transmitted.

Figure 10:
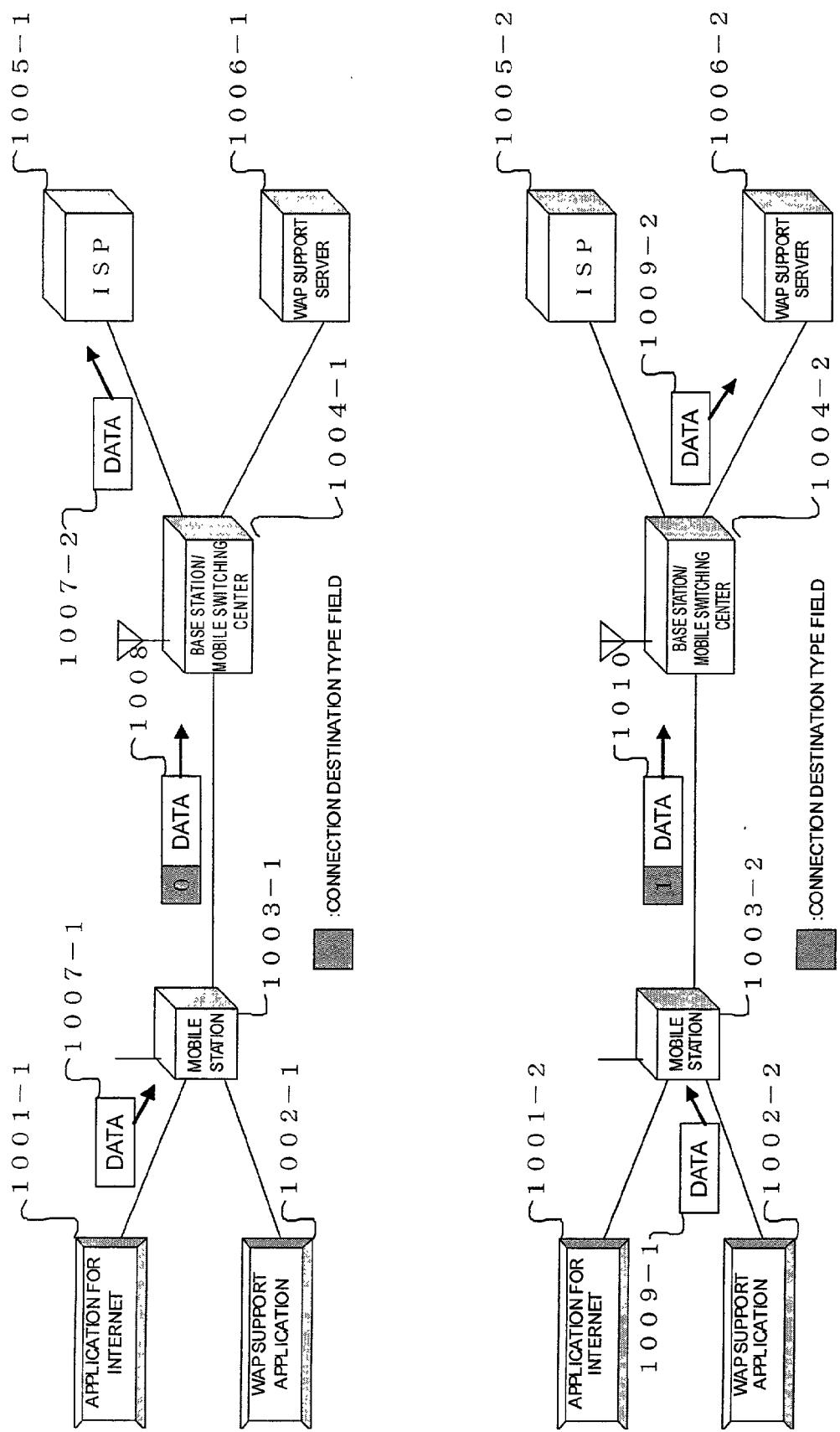
FIG. 10 is a view showing data transmission from a mobile station in the present invention to an ISP (WWW server) and a WAP support server on the basis of the type of transmission destination of data which the mobile station transmits.

FIG. 10 is a view in which a base station carries out data transmission to an ISP (WWW server) and a WAP support server according to a connection destination type field value added to a header of data by a mobile station in the present invention. The connection destination type field is used for setting of an inactivity timer value according to the data type and is used so that a base station/mobile switching center identifies an apparatus to which a packet received from the mobile station should be transmitted as shown in FIG. 10. From the correspondence table of FIG. 9, a packet with a connection destination type field value of 0 is transmitted to the ISP (WWW server) 1005-1 (1005-2), and a packet with a connection destination type field value of 1 is transmitted to the WAP support server 1006-1 (1006-2). In the example of FIG. 10, a mobile station 1003-1 adds a header in which the connection destination type field value is set to 0, to data 1007-1 from an Internet application 1001-1 (1001-2), and transmits a packet 1008 to a base station/mobile switching center 1004-1. When the base station/mobile switching center 1004-1 receives the packet 1008, since the connection destination type field value is 0, it transmits data 1007-2 to an ISP 1005-1. In the case of data 1009-1 of WAP support application 1002-1 (1002-2), a mobile station 1003-2 adds a header in which the connection destination type field value is set to 1, and transmits a packet 1010 to a base station/mobile switching center 1004-2. When the base station/mobile switching center 1004-2 receives the packet 1010, since the connection destination type field value is 1, it transmits data 1009-2 to a WAP support server 1006-2. Incidentally, in the above, it is assumed that 0 is automatically written in the field of the header when application software of the mobile station 1003 is the internet, and 1 is automatically written when it is E-mail. The same applies to the case where the base station carries out data transmission to the mobile station.

As stated above, the correspondence table of the connection destination type and the set value of the inactivity timer stores such information that the inactivity timer is set to a long time in the case of data for the internet, such as streaming video connected to the WWW server, having a relatively large size and taking a considerable communication time, and the inactivity timer is set to a short time in the case of data, such as E-mail for a cellular phone connected to the WAP support server, having a small size and taking a relatively short communication time.

As described above, the information of the connection destination type of the data received from the mobile station is compared with the correspondence table of the connection destination type and the inactivity timer value, and the base station or the mobile station changes the inactivity timer value according to the type of the data, so that an unused time of a radio channel in a non-communication state having no transmission/reception data is decreased, or a radio channel is given to many mobile stations in a cell by suppressing repetition of disconnection and connection of the radio channel, and eventually, the use efficiency of the radio channel can be improved.

Figure 11:
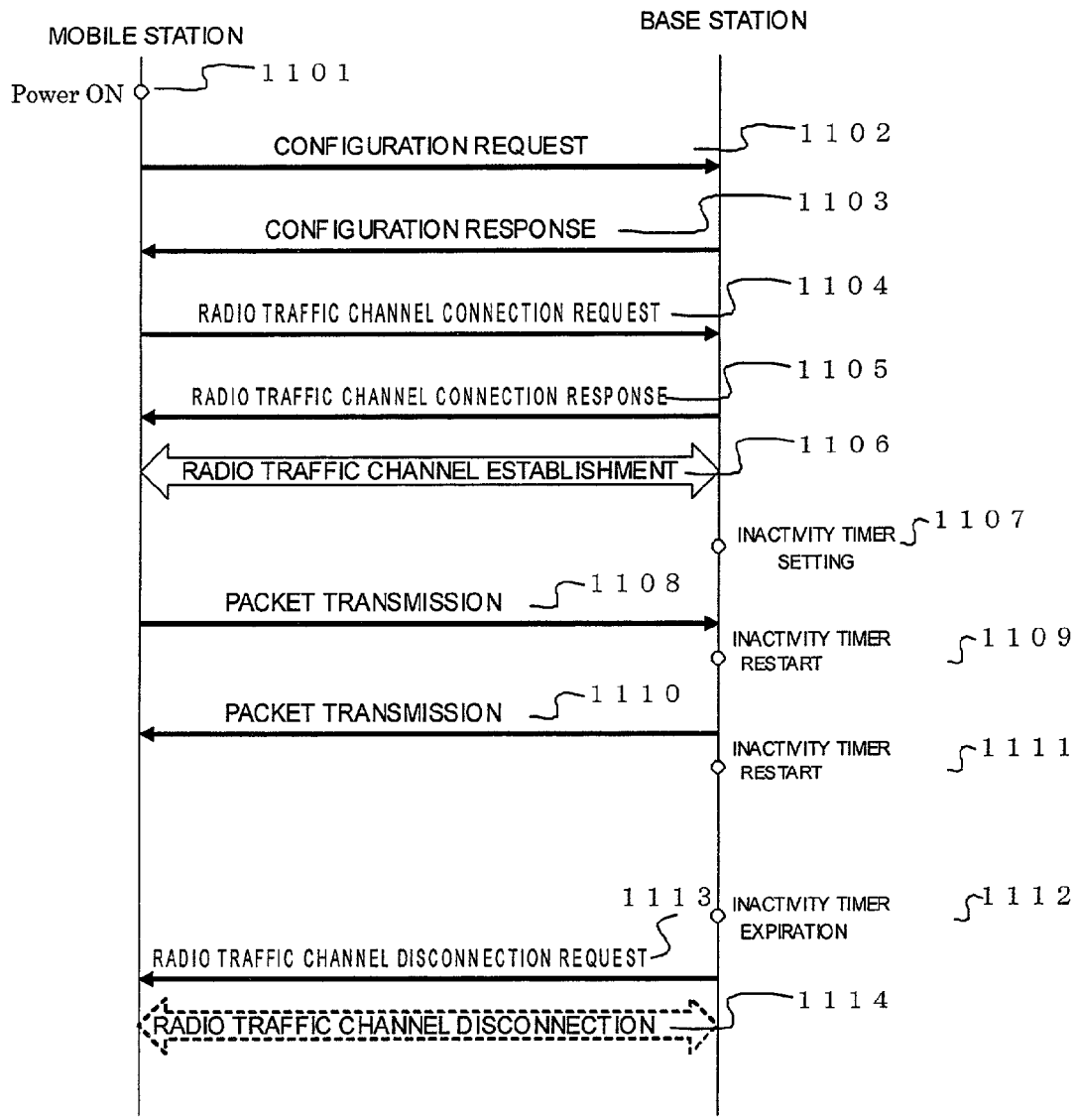
FIG. 11 is a sequence diagram between a base station and a mobile station in a case where the base station sets an inactivity timer common to all users on the basis of the type of transmission destination of data which the mobile station in the present invention transmits.

2-2. Setting of an Inactivity Timer by a Base Station 2-2-1. Inactivity Timer Common to all Users FIG. 11 is a sequence diagram between a base station and a mobile station in a case where the base station sets an inactivity timer common to all users on the basis of the connection destination type of data transmitted by the mobile station and the base station in the present invention.

In the case where the mobile station is powered (1101) to start communication, the mobile station uses a radio control channel to transmit a configuration request to the base station (1102), and the base station transmits a configuration response to the mobile station (1103). When the mobile station receives this configuration response, in order to connect a radio traffic channel for transmission/reception of data, the mobile station transmits a radio traffic channel connection request to the base station (1104). The base station confirms the resources of radio traffic channels, and transmits a radio traffic channel connection response to the mobile station (1105). When the mobile station receives this radio traffic channel connection response, a radio traffic channel for data transmission/reception is connected between the mobile station and the base station, and data can be transmitted from both the mobile station and the base station (1106).

After the radio traffic channel is connected, the base station sets the inactivity timer (1107). When the mobile station transmits a packet to the base station, and the base station receives the packet (1108), the base station restarts the inactivity timer (1109). Also when the base station transmits a packet to the mobile station and the mobile station receives the packet (1110), the base station restarts the inactivity timer (1111). Thereafter, if transmission/reception of a packet is not carried out for a specific time, the inactivity timer expires (1112). When the inactivity timer expires, the base station transmits a radio traffic channel disconnection request to the mobile station (1113), and the radio traffic channel is disconnected (1114).

Figure 12:
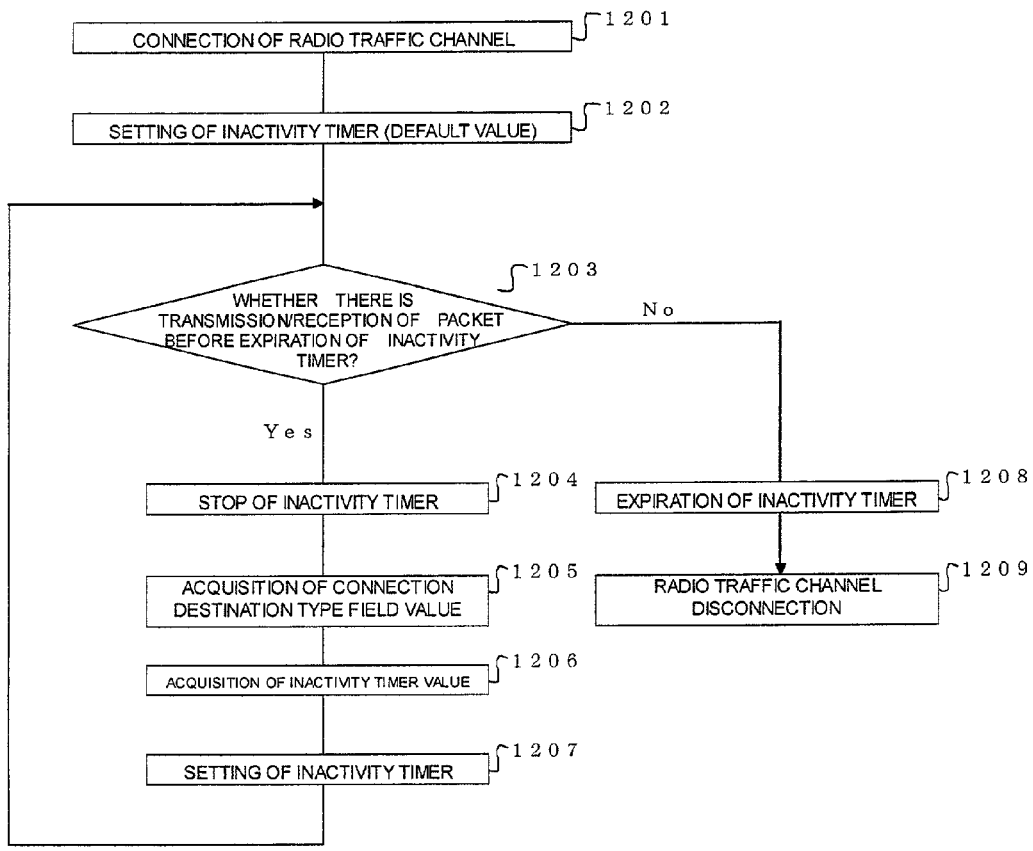
FIG. 12 is a flowchart showing a procedure in a case where a base station sets an inactivity timer value common to all users on the basis of the type of transmission destination of data which the mobile station in the present invention transmits.

FIG. 12 is a flowchart showing a procedure in which the base station in the present invention sets the inactivity timer.

After the radio traffic channel between the mobile station and the base station is connected (1201), the base station sets the inactivity timer (1202). At this time, since transmission/reception of a packet is not yet carried out between the mobile station and the base station, the inactivity timer 505 of FIG. 5 refers to the management table 508 of the memory 507, and sets the set value of the inactivity timer to the default. In the example of FIG. 9, the set value of the inactivity timer is set to 60 seconds. In the case where transmission/reception of a packet occurs before the inactivity timer expires (1203), the base station stops the operating inactivity timer 505 (1204). Besides, the base station acquires the connection destination type field value added to the header of the received packet (1205). Incidentally, the base station may acquire the connection destination field value added to the header of the transmitted packet. The inactivity timer 505 refers to the acquired connection destination type field value and the management table 508 of the memory 507, and determines a reference result as an inactivity timer value (1206). Thereafter, the inactivity timer value is used and the inactivity timer 505 is started (1207). Incidentally, after the inactivity timer is started, when transmission/reception of a packet is not carried out (1203) and the inactivity timer expires (1208), the base station carries out a disconnection processing of the radio traffic channel (1209).

As stated above, in this embodiment, on the basis of the information (connection destination type) of the transmission destination added to the header of the data transmitted from the mobile station and/or the base station, the base station changes the inactivity timer value according to the type of the data, so that an unused time of a radio traffic channel in a non-communication state is decreased, or the repetition of disconnection and connection of a radio channel is suppressed, so that the use efficiency of the radio traffic channel is improved.

2-2-2. Inactivity Timer for Each User

In the above embodiment, the correspondence table of the connection destination and the inactivity timer value shown in FIG. 9 is used commonly by all users connected to the base station. However, it is also possible to provide a different correspondence table for each user. In this case, a correspondence table of a connection destination and an inactivity timer value is contained in the data base 407 of FIG. 4.

Figure 13:
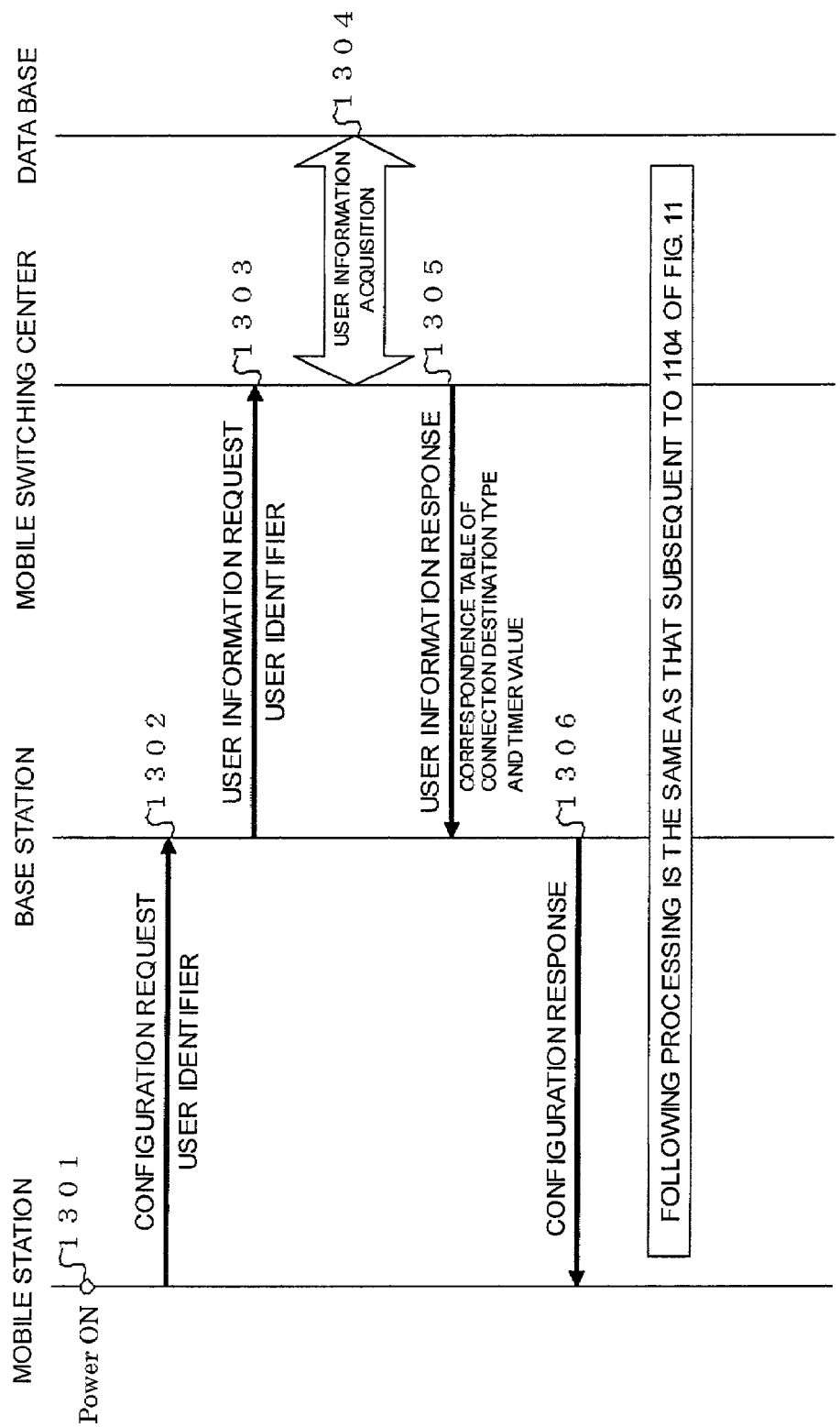
FIG. 13 is a sequence diagram between a mobile station—a base station—a mobile switching center-a data base in a case where the base station sets a different inactivity timer value for each user on the basis of the type of transmission destination of data which the mobile station in the present invention transmits.

FIG. 13 is a sequence diagram between a mobile station—a base station—a mobile switching center-a data base in a case where the base station sets a different inactivity timer value for each user on the basis of the type of a transmission destination of data which the mobile station and the base station in the present invention transmit.

In the case where the mobile station is powered (1301) to start communication, the mobile station transmits a configuration request to the base station (1302). This configuration request includes a user identifier. When receiving the configuration request, the base station transmits a user information request to the mobile switching center (1303). This user information request includes the user identifier of the mobile station. When receiving the user information request, the mobile switching center can acquire the user information from the data base 407 of FIG. 4 (1304). This user information includes the correspondence table of the connection destination type and the inactivity timer value different from FIG. 9. When acquiring the user information, the mobile switching center transmits the user information response to the base station (1305). This user information response includes the correspondence table of the connection destination type and the inactivity timer value corresponding to the user. When receiving the user information response, the base station transmits a configuration response to the mobile station (1306). When the mobile station receives the configuration response, similarly to the foregoing embodiment, the processing subsequent to the step 1104 of FIG. 11 is carried out.

FIG. 14 shows an example of a correspondence table 1401 of a connection destination type and an inactivity timer value varied for each user. In the case where a different 15 inactivity timer is set for each user, the correspondence table 1401 as shown in FIG. 14, different from FIG. 9, is stored in the management table 508 of the memory 507 of FIG. 5.

2-3. Setting of an Inactivity Timer by a Mobile Station

Next, an embodiment in which an inactivity timer is operated by a mobile station will be described. The foregoing embodiment is the embodiment in which the inactivity timer is operated by the base station. However, if the correspondence table of the connection destination type and the inactivity timer value is notified from the base station to the mobile station, the mobile station can also operate the inactivity timer. As stated above, even when the inactivity timer is operated by the mobile station, the same effect as the foregoing embodiment can be obtained.

Figure 15:
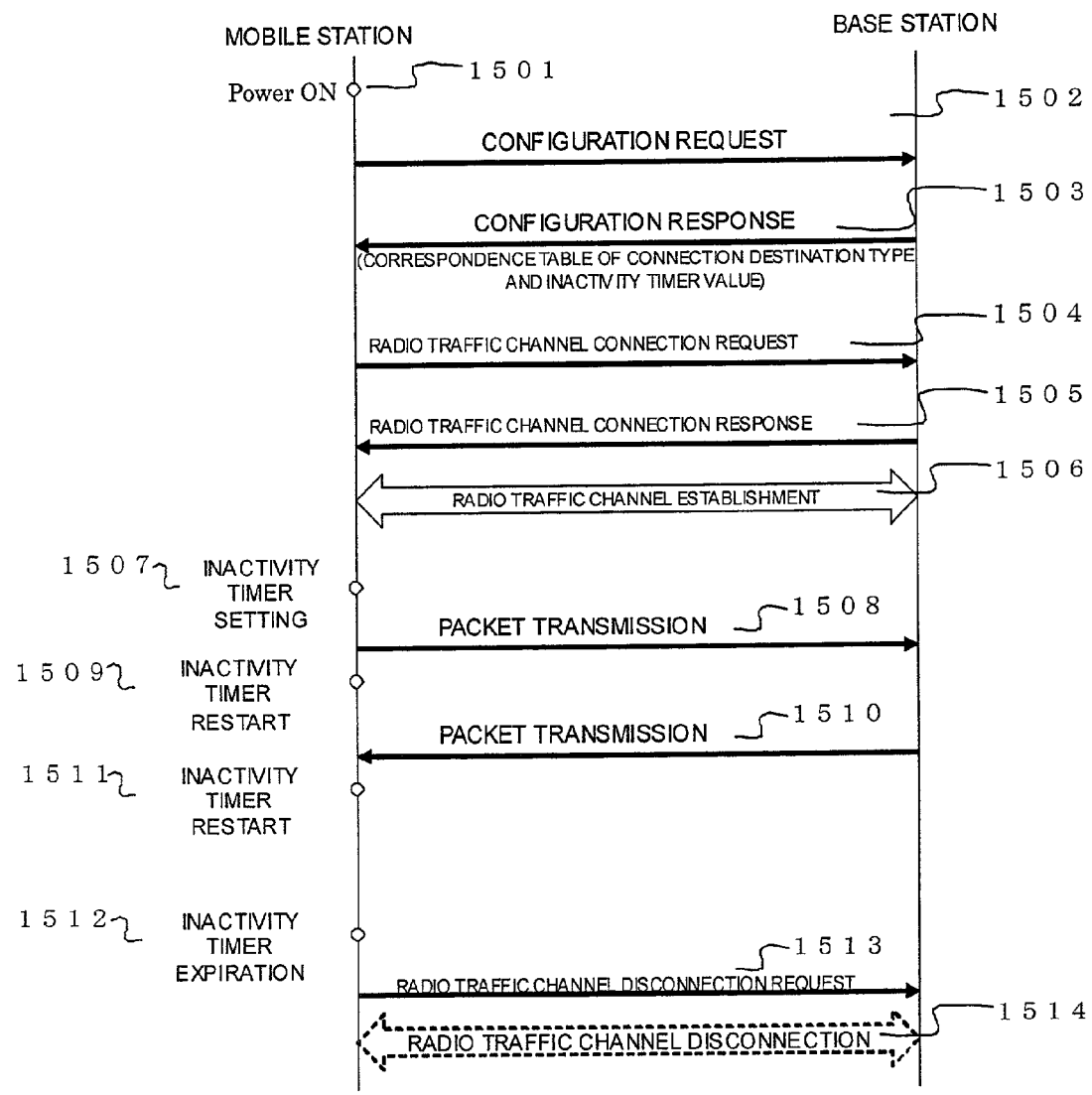
FIG. 15 is a sequence diagram between a base station and a mobile station in a case where the mobile station sets an inactivity timer value on the basis of the type of transmission destination of data which the mobile station in the present invention transmits.

FIG. 15 is a sequence diagram between a base station and a mobile station in a case where the mobile station sets an inactivity timer value on the basis of the type of a transmission destination of data transmitted by the mobile station and the base station in the present invention.

In the case where the mobile station is powered (1501) to start communication, the mobile station transmits a configuration request to the base station (1502), and then, the base station transmits a configuration response to the mobile station (1503). In the case where the inactivity timer is operated by the mobile station, a correspondence table of a connection destination type and an inactivity timer value as shown in FIG. 9, which is held by the base station in the foregoing embodiment, is included in the configuration response. The mobile station receives this configuration response and stores the correspondence table in the management table 607 of the memory 606 in the mobile station shown in FIG. 6. Thereafter, a radio traffic channel for data transmission/reception is connected (1506) through a processing of a radio traffic channel connection request (1504) from the mobile station to the base station, and a processing of a radio traffic channel connection response (1505) from the base station to the mobile station. Thereafter, on the basis of the connection destination type added to the header of the data transmitted and/or received, the inactivity timer 604 in the mobile station shown in FIG. 6 refers to the management table 607 in the memory 606, and by that, the mobile station sets the inactivity timer according to the type of the data (1507). When the mobile station transmits a packet (1508), the inactivity timer is restarted (1509). Also when the mobile station receives a packet from the base station (1510), the inactivity timer is restarted (1511). Thereafter, when transmission/reception of a packet is not carried out for a specific time, the inactivity timer expires (1512). When the inactivity timer expires, the mobile station transmits a radio traffic channel disconnection request to the base station (1513) and the radio traffic channel is disconnected (1514).

2-4. Transmission/Reception of a Plurality of Applications

The foregoing embodiment relates to the case where one kind of application data is transmitted and received on one radio channel. Next, an inactivity timer setting method in the case where a plurality of application data are transmitted and received on one radio traffic channel, will be described with reference to FIG. 16.

Figure 16:
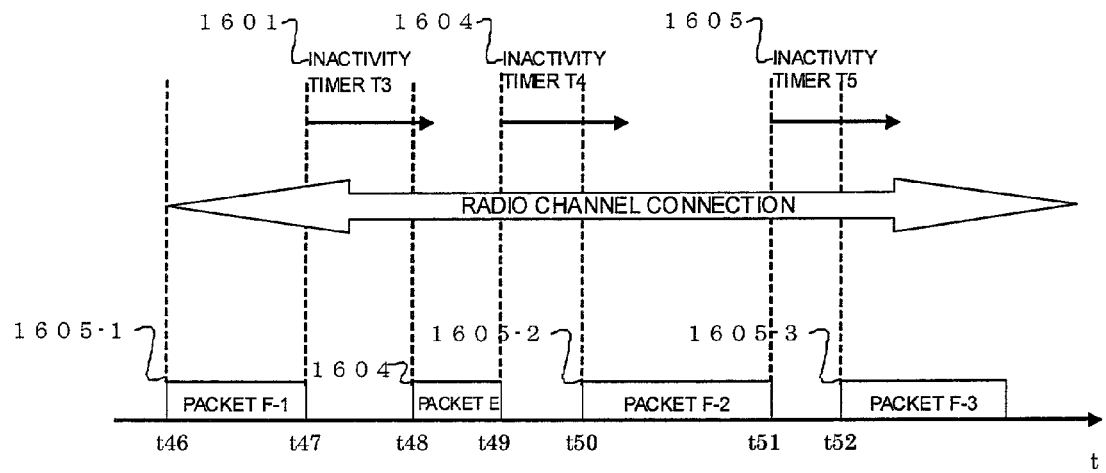
FIG. 16 is a view showing a state of a radio channel in a case where a base station or a mobile station transmits and receives two kinds of application data on one radio channel on the basis of the type of transmission destination of data which the mobile station in the present invention transmits.

FIG. 16 shows an example in which two kinds of application data are transmitted and received on one radio channel. A packet E (1604) is data such as E-mail having a small size and taking a short communication time. A packet F-1 (1605-1), a packet F-2 (1605-2) and a packet F-3 (16053) are such that data, such as stream data of moving picture etc., having a large size and taking a considerable communication time, is divided into packet data. First, when receiving the packet F-1 (1605-1) at time t46, the base station is instructed through the configuration request from the mobile station with the connection destination type field value of 0, that is, according to FIG. 9, is instructed to make the inactivity timer value 100 seconds, so that an inactivity timer T3 (1601) is set to 100 seconds. Thereafter, before receiving all blocks of the divided packet data F (1605), the base station receives the packet E (1604) from the same mobile station. Here, by the configuration request with the connection destination type field value of 1, that is, according to FIG. 9, an instruction is made so that the inactivity timer value is made 30 seconds.

Here, as an inactivity timer setting method which the base station can adopt, two examples will be mentioned.

The one is a method of selecting a longer one of inactivity timer values. In this case, priority is given to transmission/reception of divided packet data of data, such as stream data of moving pictures, which has a large size and takes a considerable time, and an optimum inactivity timer value corresponding to that is given. Thus, all of inactivity timers T3 (1601), T2 (1602) and T3 (1603) of FIG. 16 become 100 seconds.

The other is a method of averaging inactivity timer values. As described above, although the inactivity timer is set to 100 seconds in the inactivity timer T3 (1601), at a point of time t48, two kinds of inactivity timer values, 100 seconds and 30 seconds, are specified from the mobile station, and the base station averages them by the inactivity timer 505 of FIG. 5 to set 65 seconds in the inactivity timer T4. After time t50, if there is no transmission/reception of other application data, the inactivity timer T5 also becomes 65 seconds.

3. Second Embodiment—Setting of an Inactivity Timer by a TCP/UDP Header

A method in which an application is judged from a port number in a TCP/UDP header and an inactivity timer value is set, will be described below.

Both the TCP (Transmission Control Protocol) and the UDP (User Datagram Protocol) are upper protocols of the IP (Internet Protocol), and under the environment where packet data communication is carried out using the TCP/IP protocol, data is added with the TCP header or the UDP header and is transmitted. The port number is used for identifying programs carrying out communication in the same computer. This port number includes a well-known port number, and in application protocols, such as http or ftp, which are used very widely, a port number to be used is determined in advance.

Figure 17:
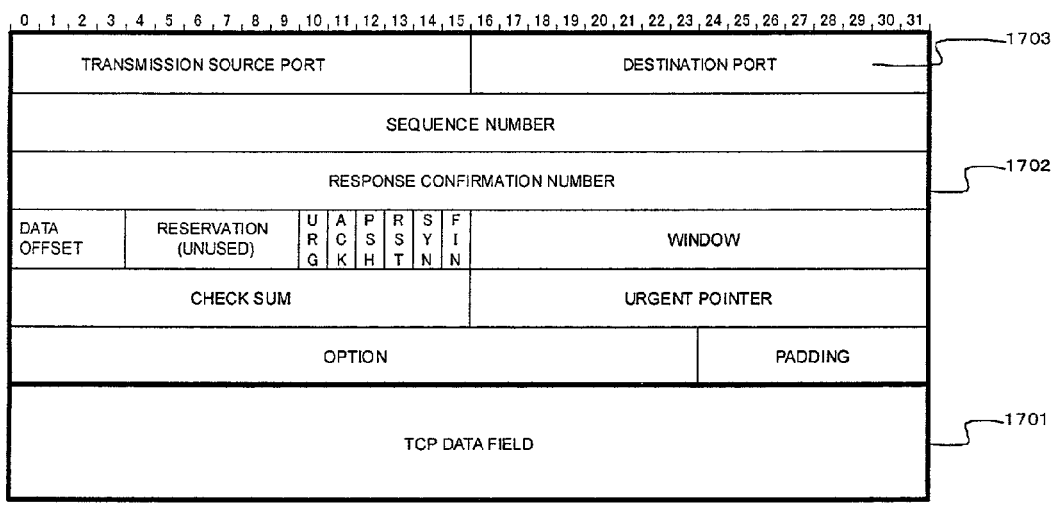
FIG. 17 is a view showing a header format of TCP.

FIG. 17 is a header format of the TCP. As described above, a TCP header 1702 is added to a TCP data field 1701, and a port number is indicated in a destination port 1703 assigned to 17-th to 32-th bits.

Figures 18, 19:
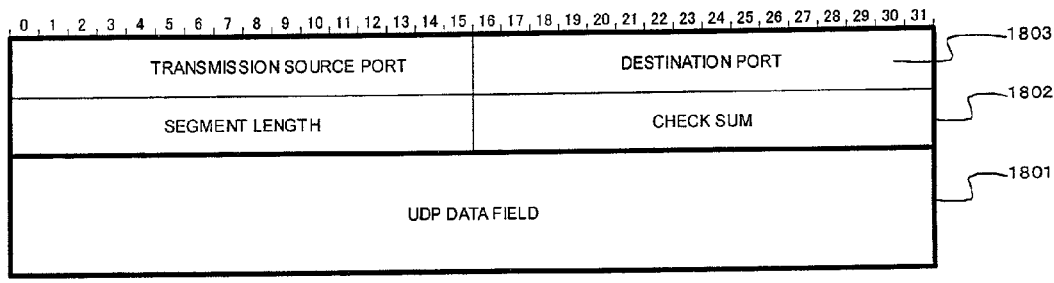
FIG. 18 is a view showing a header format of UDP.
FIG. 19 is a view showing an example of a correspondence table of a port number and an inactivity timer value in the present invention.

FIG. 18 is a header format of the UDP. Similarly to the foregoing TCP header, a UDP header 1802 is added to a UDP data field 1801, and a port number is indicated in a destination port 1803 assigned to 17-th to 32-th bits.

In the present invention, from the port number of a pack to be transmitted and received, the base station judges the application and sets the inactivity timer.

FIG. 19 shows an example of a correspondence table of a port number and an inactivity timer value. The default indicates a set value of the inactivity timer which is set immediately after a radio traffic channel is established. Besides, by the same reason as that described in the first embodiment, the ftp of the protocol normally used for file transfer, and the http of the protocol mainly used for transfer of HTML files or the like are regarded as data which has a large size and takes a considerable communication time, and an inactivity timer value is set to 100 seconds. Incidentally, the content corresponding to WAP is not contained in the well-known port number. In the case where the monitored port number is one other than the well-known port number, 30 seconds are assigned.

Figure 20:
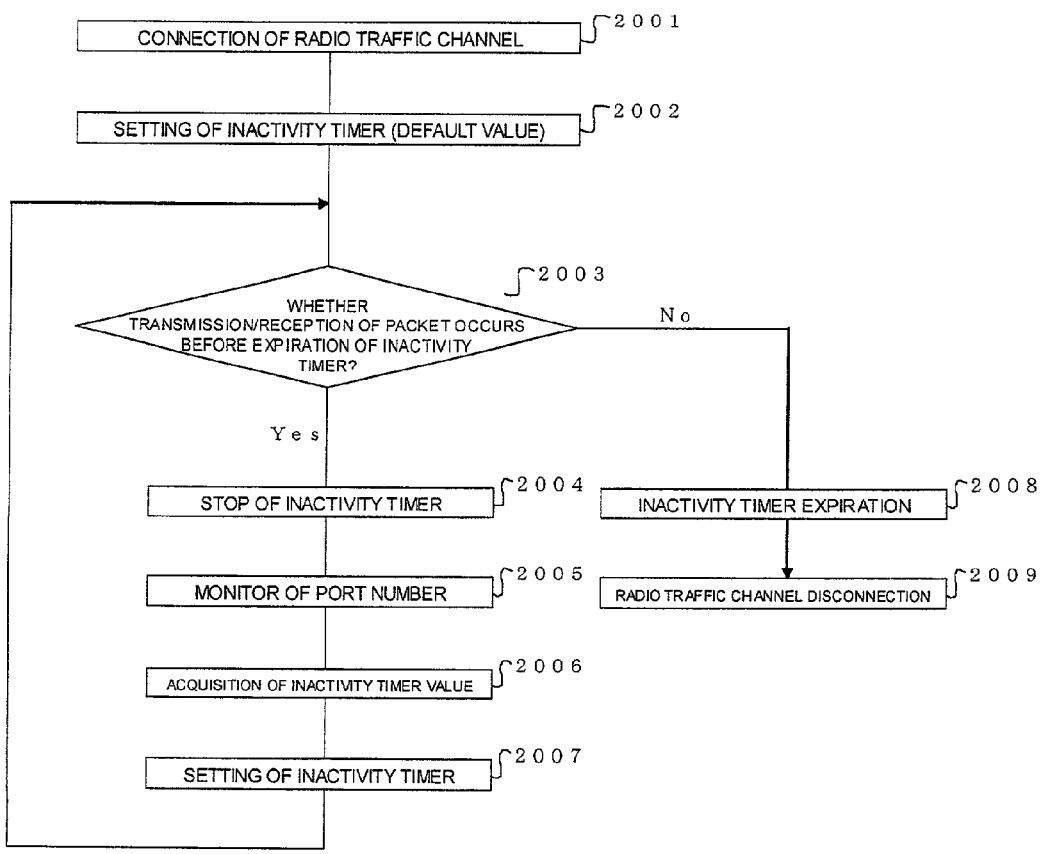
FIG. 20 is a flowchart showing a procedure in a case where a base station in the present invention judges an application from a port number of a TCP/UDP header and sets an inactivity timer value common to all users.

FIG. 20 is a flowchart showing a procedure in which a base station in the present invention judges an application from a port number in the TCP/UDP header and sets an inactivity timer value.

After a radio traffic channel between a mobile station and a base station is connected (2001), the base station sets an inactivity timer (2002). At this point of time, since transmission/reception of a packet is not yet carried out between the mobile station and the base station, the inactivity timer 505 in the base station shown in FIG. 5 refers to the management table 508 of the memory 507, and sets the set value of the inactivity timer to the default. In the example of FIG. 19, the set value of the inactivity timer is set to 60 seconds. In the case where transmission/reception of a packet occurs before the inactivity timer expires (2003), the base station stops the operating inactivity timer 505 (2004). Besides, the base station monitors the port number registered in the TCP or UDP header field of the received packet (2005). The inactivity timer 505 refers to the acquired port number and the management table 508 of the memory 507, and determines a reference result as an inactivity timer value (2006). Thereafter, the inactivity timer value is used and the inactivity timer 505 is started (2007). Incidentally, after the inactivity timer is started, if transmission/reception of a packet is not carried out (2003) and the inactivity timer expires (2008), a disconnection processing of the radio channel is carried out (2009).

Similarly to the first embodiment, in the present invention, it is also possible to set a different inactivity timer for each user or to set an inactivity timer by the mobile station. Besides, the base station may monitor the port number registered in the TCP or UDP header of the transmitted packet at the step 2005.

4. Other Embodiment—Setting of an Inactivity Timer According to Various Pieces of Information 4-1. Setting According to Contract Information of a Mobile Station A method of individually setting an inactivity timer value according to information relating to a mobile station contract will be described below.

Figure 21:
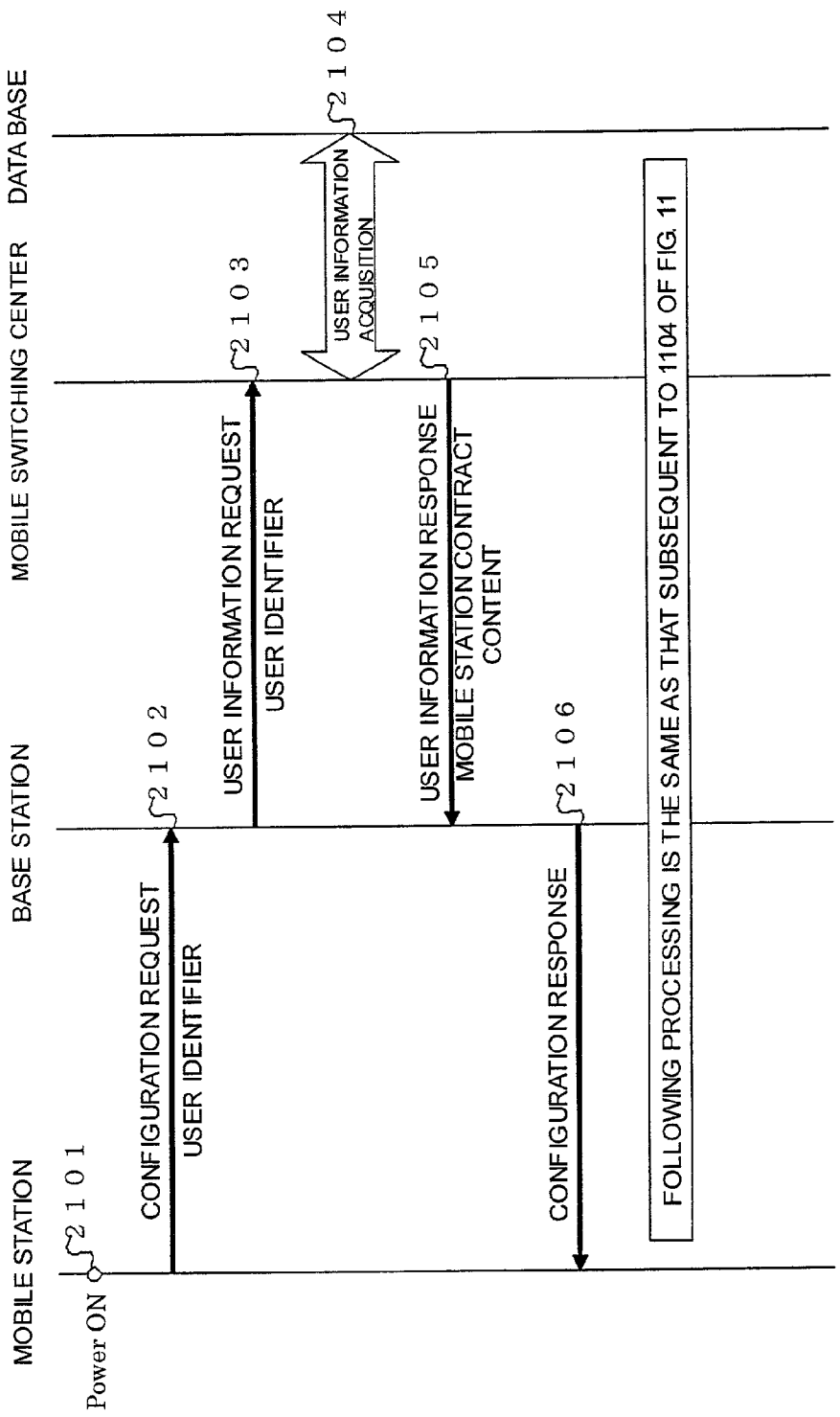
FIG. 21 is a sequence diagram between a mobile station—a base station—a mobile switching center-a data base in a case where the base station in the present invention sets a different inactivity timer value for each user on the basis of mobile station contract content.

FIG. 21 is a sequence diagram between a mobile station—a base station—a mobile switching center-a data base in a case where the base station in the present invention sets a different inactivity timer value for each user according to information relating to a mobile station contract.

In the case where the mobile station is powered (2101) to start communication, the mobile station transmits a configuration request to the base station (2102). This configuration request includes a user identifier. When receiving the configuration request, the base station transmits a user information request to the mobile switching center (2103). This user information request includes the user identifier of the mobile station. When receiving the user information request, the mobile switching center acquires the contract content of the user from the data base 407 of FIG. 4 (2104). When acquiring the user information, the mobile switching center transmits a user information response to the base station (2105). This user information response includes the contract content of the user. When receiving the user information response, the base station transmits a configuration response to the mobile station (2106). When receiving this configuration response, the mobile station carries out the processing subsequent to the step 1104 of FIG. 11 similarly to the foregoing embodiment, and sets the inactivity timer value corresponding to the mobile station contract. Here, there is also a method in which the mobile switching center acquires the inactivity timer value itself corresponding to the mobile station contract as the user information.

4-2. Setting According to a Past Communication Amount of a Mobile Station

A method of setting an inactivity timer according to a past communication amount of a mobile station will be described below.

FIG. 22 is a view showing an example of a correspondence table of an amount of communication in the past month and an inactivity timer value. This is such that a long inactivity timer value is given to a mobile station which carried out a large amount of packet data communication, so that a connected state of a long time is realized. The default indicates a set value of the inactivity timer which is set immediately after a radio traffic channel is established. Incidentally, it is possible to make a measurement period of a renewal cycle of the inactivity timer correspond to one hour, one day or one week.

Figure 23:
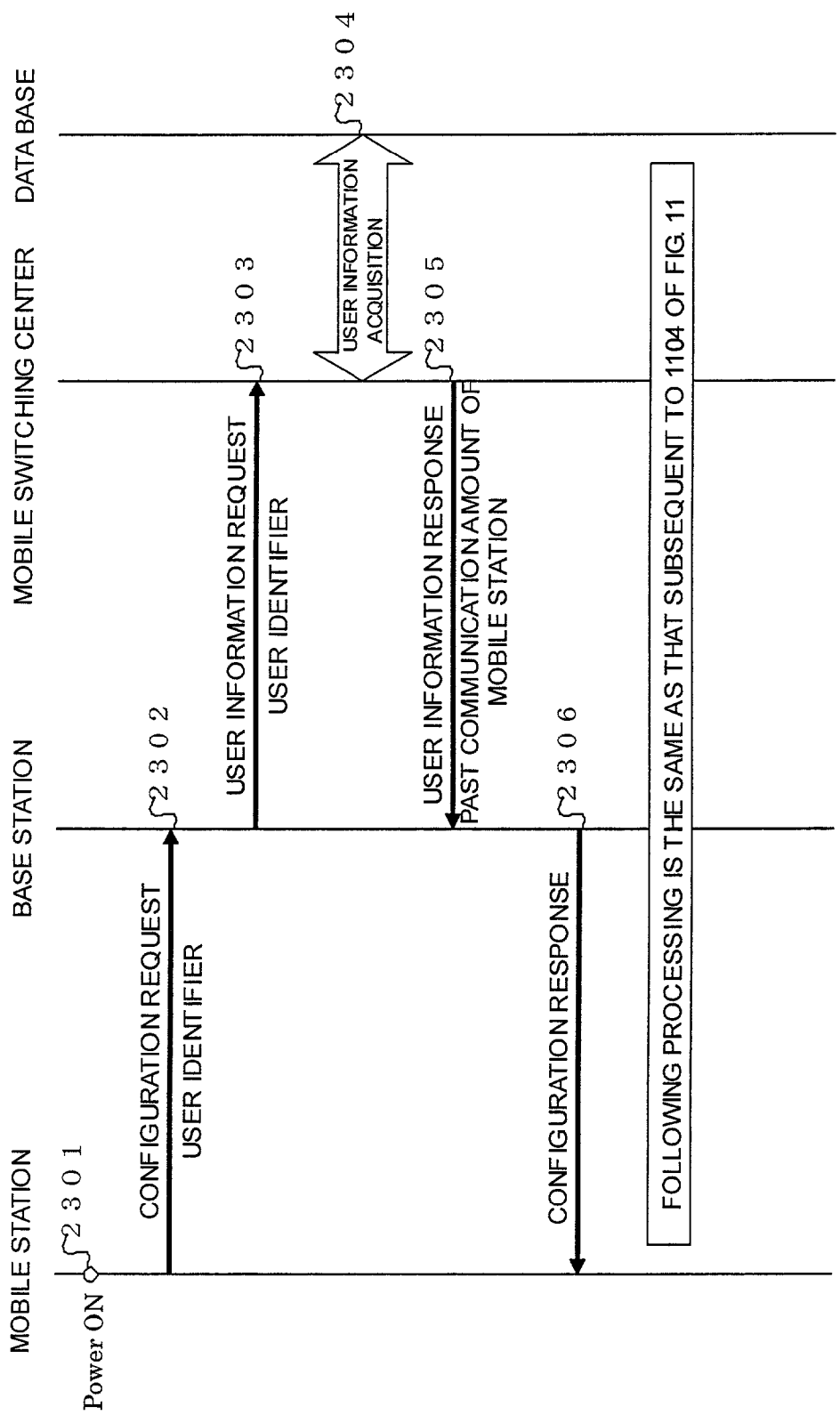
FIG. 23 is a sequence diagram between a mobile station—a base station—a mobile switching center-a data base in a case where the base station in the present invention sets a different inactivity timer value for each user on the basis of the past communication amount of the mobile station.

FIG. 23 is a sequence diagram between a mobile station—a base station—a mobile switching center-a data base in a case where the base station in the present invention sets a different inactivity timer value for each user according to the past communication amount of the mobile station.

In the case where the mobile station is powered (2301) to start communication, the mobile station transmits a configuration request to the base station (2302). This configuration request includes a user identifier. When receiving the configuration request, the base station transmits a user information request to the mobile switching center (2303). This user information request includes the user identifier of the mobile station. When receiving the user information request, the mobile switching center acquires the past communication amount of the user from the data base 407 of FIG. 4 (2304). When acquiring the user information, the mobile switching center transmits a user information response to the base station (2305). This user information response includes the past communication amount of the user. When receiving the user information response, the base station transmits a configuration response to the mobile station (2306). When receiving this configuration response, the mobile station carries out the processing subsequent to the step 1104 of FIG. 11 similarly to the foregoing embodiment, and sets the inactivity timer value corresponding to the past communication amount stored in the management table 508 of the memory 507 of FIG. 5 and shown in FIG. 22. Here, there is also a method in which the mobile switching center acquires the inactivity timer value itself corresponding to the past communication amount as the user information.

4-3. Setting According to a Past Communication Content of a Mobile Station

In the foregoing method of setting the inactivity timer value from the application type or the port number in the TCP/UDP header, the inactivity timer value is set by using the information under call control. That is, the inactivity timer value for each call or under communication is set. On the other hand, in the method of setting the inactivity timer value using the contract content of the mobile station and the past communication amount thereof, macro inactivity timer setting is carried out for each mobile station. Next, an embodiment in which the macro inactivity timer setting is carried out by using the application type and the TCP/UDP header as parameters will be described.

A method of setting an inactivity timer value according to a past communication content of a mobile station will be described below.

FIG. 24 is a view showing an example of a correspondence table of a past communication content and an inactivity timer value. According to such communication contents that the user mainly has a tendency to carry out transmission/reception of data such as stream video having a large size and taking a considerable communication time or has a tendency to carry out transmission/reception of data such as E-mail having a small size and taking a short communication time, the inactivity timer value is assigned. Here, an inactivity timer value of a mobile station in which the occasions of the WAP connection are more than those of the internet connection is set to 30 seconds, and an inactivity timer value of a mobile station in which occasions of the internet connection are more than those of the WAP connection is set to 100 seconds. The default indicates a set value of the inactivity timer which is set immediately after the radio traffic channel is established. Incidentally, it is possible to make a measurement period of a renewal cycle of the inactivity timer correspond to one hour, one day, or one week.

Figure 25:
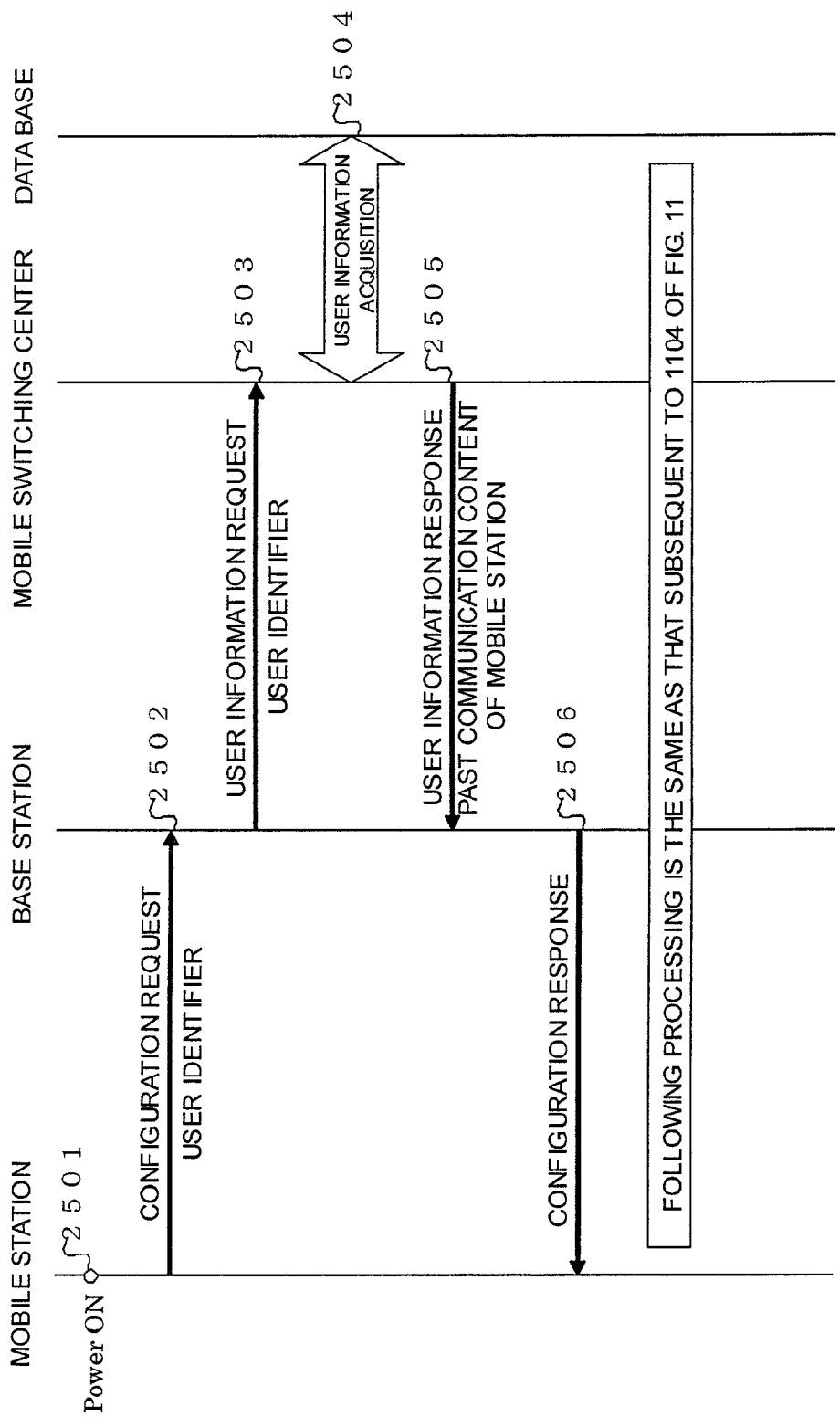
FIG. 25 is a sequence diagram between a mobile station—a base station—a mobile switching center-a data base in a case where the base station in the present invention sets a different inactivity timer value for each user on the basis of the past communication content of the mobile station.

FIG. 25 is a sequence diagram between a mobile station—a base station—a mobile switching center-a data base in a case where the base station in the present invention sets a different inactivity timer value for each user according to a past communication content of the mobile station.

In the case where the mobile station is powered (2501) to start communication, the mobile station transmits a configuration request to the base station (2502). This configuration request includes a user identifier. When receiving the configuration request, the base station transmits a user information request to the mobile switching center (2503). This user information request includes the user identifier of the mobile station. When receiving the user information request, the mobile switching center acquires the past communication content of the user from the data base 407 of FIG. 4 (2504). When acquiring the user information, the mobile switching center transmits a user information response to the base station (2505). This user information response includes the past communication content of the user. When receiving the user information response, the base station transmits a configuration response to the mobile station (2506). When receiving this configuration response, the mobile station carries out the processing subsequent to the step 1104 of FIG. 11 similarly to the foregoing embodiment, and sets the inactivity timer value corresponding to the past communication content stored in the management table 508 of the memory 507 of FIG. 5 and shown in FIG. 24. Here, there is also a method in which the mobile switching center acquires the inactivity timer value itself corresponding to the past communication content as the user information.

4-4. Setting According to a Traffic State of a Base Station

A method of setting an inactivity timer value according to a traffic state in one or plural base stations will be described below. In general, there is a time zone in which the traffic is high and a time zone in which the traffic is low, and for example, an inactivity timer is set to a short time in the former, and an inactivity timer is set to a long time in the latter. As another example, there is a method in which in each base station, a past time zone of high traffic and a time zone of low traffic are stored in the management table 508 of the memory 507 in the base station shown in FIG. 5, and the inactivity timer value is set similarly to the above. As further another example, there is also a method in which an inactivity timer of a cell such as a business district where transmission/reception of data having a large size and taking a considerable communication time is frequently carried out, is set to a long time, and an inactivity timer of a cell such as a downtown where transmission/reception of data such as E-mail having a small size and taking a short communication time is frequently carries out, is set to a short time.

4-5. Setting According to Traffic and an Application Type

As described above, although there is a method of uniformly setting an inactivity timer value according to the traffic, on the basis of the selection method of plural inactivity timers according to the application type and the like, an embodiment in which a combination of inactivity timer values for respective application types is renewed according to the traffic will be described.

The inactivity timer 505 in the base station shown in FIG. 5 previously totalizes the number of connected mobile stations, the number of dormant mobile stations, and the sum of those in one or plural base stations, and for example, the inactivity timer is set to a short time in the case where the number of the connected mobile stations is large, and the inactivity timer is set to a long time in the case where the number of the connected mobile stations is small. Alternatively, the number of dormant mobile stations is totalized, and the inactivity timer is set to a long time in the case where the number of the dormant mobile stations is large, and the inactivity timer is set to a short time in the case where it is small. Alternatively, the sum of the number of the connected mobile stations and the number of the dormant mobile stations are totalized, and for example, the inactivity timer is set to a short time in the case where the total number is large, and the inactivity timer is set to a long time in the case where it is small.

Figure 26:
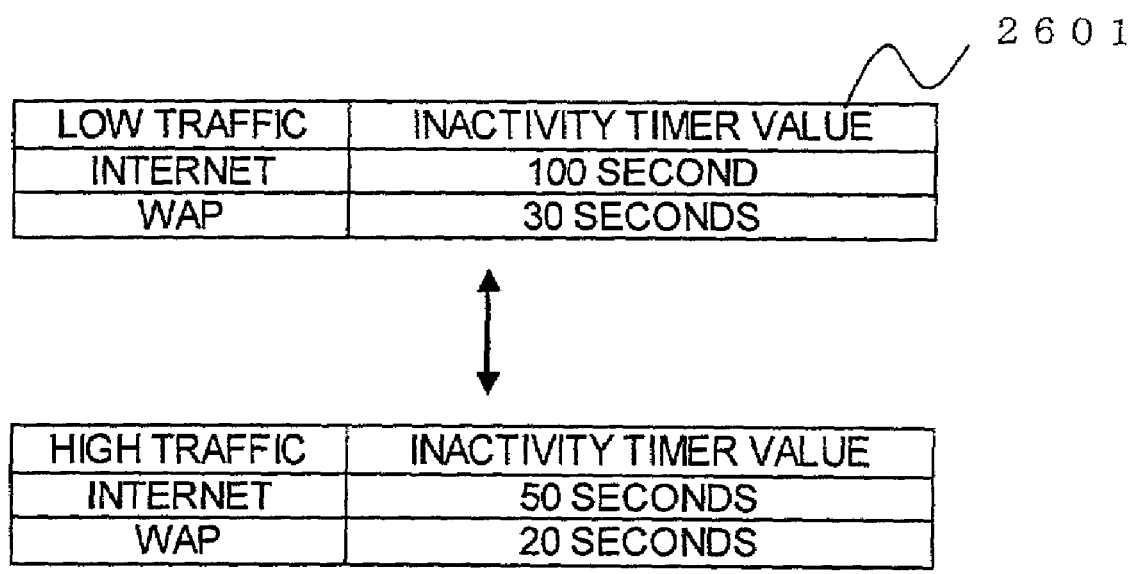
FIG. 26 is a view showing an example of a correspondence table of a traffic state and an inactivity timer value in the present invention.

FIG. 26 is a view showing an example of a correspondence table of a traffic state and an inactivity timer value. The drawing shows inactivity timer values in the case where the traffic is judged to be low and the case where the traffic is judged to be high, from the result of the previous totalization of the number of connected mobile stations, the number of dormant mobile stations, and the sum of those in one or plural base stations. In the case of the low traffic, a long inactivity timer value is given in order to realize a connected state for a long time. On the other hand, in the case of the high traffic, a short inactivity timer value is given in order to bring more mobile stations into the connected state.

In the above embodiment, it is possible to prepare a plurality of set times of the inactivity timer and to make the time variable according to various states, or to use them in combination.

As described a above, according to the present invention, the inactivity timer value is changed according to various states such as the type of data, so that an unused time of a communication channel in a non-communication time is decreased, and channel use efficiency can be raised. By this, there also occurs an opportunity of raising a communication opportunity of each mobile station. Besides, by suitable setting of an inactivity timer for each application, the number of connection/disconnection processings of a radio channel can be decreased.

What is claimed is:

1. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acquires information of one of the application type, the connection destination type, and the traffic pattern in the transmitted or received data, wherein the control unit refers to the memory based on the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein:

the memory further stores the inactivity timer value for each of the application type, the connection destination type, and the traffic pattern correspondingly to user information; and wherein the control unit further acquires the user information and sets the inactivity timer value for each user and for each of the application type, the connection destination type or the traffic pattern.

2. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acquires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein in a case where a plurality of inactivity timer values are set in a predetermined time, the control unit gives priority to a larger or smaller value, and sets it as the inactivity timer value for a previously fixed period.

3. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acguires information of one of the application type, the connection destination type, and the traffic pattern in the transmitted or received data, the control unit refers to the memory on the basis of the acquired information of one of the application type, the connection destination type, and the traffic pattern to obtain an inactivity timer value and sets the inactivity timer value, and when a count value of the inactivity timer reaches the set inactivity timer value, the control unit carries out a control to change the connected state to the dormant state, wherein in a case where a plurality of inactivity timer values are set in a predetermined time, the control unit sets an average value of those as the inactivity timer value for a previously fixed period.

4. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acguires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein:

the application type is for identifying an application used in communication with the mobile station as one for an internet or one for a WAP; and in a case where the application type is the internet, the control unit sets, as the inactivity timer value, a period longer than that for the WAP.

5. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acguires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein port information included in a TCP header or a UDP header is used as the information of the application type or the connection destination type.

6. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acquires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein:

the traffic pattern indicates contract information of the mobile station in a connected state; and the control unit sets the inactivity timer value according to the contract information of the mobile station.

7. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acguires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, wherein:

the traffic pattern indicates a past communication amount of the mobile station; and the control unit sets the inactivity timer value according to the past communication amount.

8. A radio base station/radio base station controller for carrying out communication with a mobile station by using a radio channel, comprising:

a control unit for controlling a connected state in which the radio channel for carrying out communication with the mobile station is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the mobile station or transmission of a packet to the mobile station, wherein in a case where the radio base station/radio base station controller transmits or receives data to or from the mobile station, the control unit acguires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein:

the traffic pattern indicates a past communication content of the mobile station; and the control unit sets the inactivity timer value according to the past communication content.

9. A mobile station for carrying out communication with a radio base station/radio base station controller by using a radio channel, comprising:

a control unit for controlling a connected state in which the radio channel for carrying out communication with the radio base station/radio base station controller is secured and a dormant state in which a call is brought into a suspended state and the radio channel is disconnected;

a memory for storing an inactivity timer value as a timing when the connected state is changed to the dormant state, according to one of an application type, a connection destination type, and a traffic pattern; and an inactivity timer for starting to count up in response to reception of a packet from the radio base station/radio base station controller or transmission of a packet to the radio base station/radio base station controller, wherein in a case where the mobile station transmits or receives data to or from the radio base station/radio base station controller, the control unit acguires information of one of the application type, the connection destination type, and the traffic pattern in the transmitted or received data, wherein the control unit refers to the memory on the basis of the acquired information of one of the application type, the connection destination type, and the traffic pattern to obtain an inactivity timer value and sets the inactivity timer value, wherein when a count value of the inactivity timer reaches the set inactivity timer value, the control unit carries out a control to change the connected state to the dormant state, and wherein:

the mobile station transmits a configuration request to the base station/base station controller;

the base station/base station controller transmits a configuration response including a held correspondence table of the inactivity timer value with respect to one of the application type, the connection type, and the traffic pattern to the mobile station; and the mobile station receives the configuration response and stores the correspondence table in the memory.

* * * * *